US012810113B2

(12) United States Patent
Taheri et al.

(10) Patent No.: US 12,810,113 B2
(45) Date of Patent: Nov. 24, 2026

(54) DETERMINATION OF DENSE EMBEDDING TENSORS FOR LOG DATA USING BLOCKWISE RECURRENT NEURAL NETWORKS

(71) Applicant: VIAVI Solutions Inc., Chandler, AZ (US)

(72) Inventors: Sayed Taheri, Cheshire (GB); Faris Muhammad, Edgware (GB); Hamed Al-Raweshidy, New Denham (GB)

(73) Assignee: VIAVI Solutions Inc., Chandler, AZ (US)

( * ) Notice: Subject to any disclaimer, the term of this patent is extended or adjusted under 35 U.S.C. 154(b) by 761 days.

(21) Appl. No.: 18/301,102

(22) Filed: Apr. 14, 2023

(65) Prior Publication Data

US 2024/0346286 A1 Oct. 17, 2024

(51) Int. Cl.
*G06N 3/0442* (2023.01)

(52) U.S. Cl.
CPC .................................. *G06N 3/0442* (2023.01)

(58) Field of Classification Search
CPC ........ G06N 3/0442; G06N 3/096; G06N 3/09; G06N 3/0985; G06F 16/33; G06F 16/903; G06F 18/22
USPC ........ 706/12, 20, 21, 25, 26, 45, 50, 15, 16, 706/44; 707/602, 688, 692, 723, 724, 707/737, 769, 770, 802, 804, 999.1, 999.2
See application file for complete search history.

(56) References Cited

U.S. PATENT DOCUMENTS

| | | | | |
|---|---|---|---|---|
| 11,218,498 | B2 | 1/2022 | Hajimirsadeghi et al. | |
| 11,416,904 | B1 * | 8/2022 | He | G06N 20/00 |
| 11,443,168 | B2 | 9/2022 | Srinivas et al. | |
| 2020/0117446 | A1 * | 4/2020 | Smith | G06N 3/09 |
| 2022/0108181 | A1 | 4/2022 | Ahmadi et al. | |
| 2022/0284277 | A1 * | 9/2022 | Zhu | G06N 3/08 |
| 2024/0304177 | A1 * | 9/2024 | Wu | G06F 40/30 |
| 2025/0363339 | A1 * | 11/2025 | Yao | G06N 3/0464 |

FOREIGN PATENT DOCUMENTS

EP 4160435 A1 4/2023

OTHER PUBLICATIONS

Extended European Search Report for European Application No. EP241699016 dated Oct. 17, 2024, 11 pages.

(Continued)

*Primary Examiner* — Md I Uddin
(74) *Attorney, Agent, or Firm* — Harrity & Harrity, LLP

(57) ABSTRACT

In some implementations, a device may receive information associated with a software log corpus. The device may identify alphanumeric blocks in the software log corpus. The device may encode the blocks to generate numeric encoded blocks. The device may generate a set of input sequences and a set of target sequences based on the encoded blocks and a statistical block length associated with the blocks, wherein the set of target sequences are shifted versions of the set of input sequences. The device may generate a training dataset for embedding computation based on combining the set of input sequences and the set of target sequences into a tuple, partitioning the tuple into batches, and shuffling the batches to obtain the training dataset. The device may generate a set of dense embedding tensors using the training dataset and the encoded blocks.

20 Claims, 12 Drawing Sheets

(56) References Cited

OTHER PUBLICATIONS

Wang, J., et al., "LogEvent2vec: LogEvent-to-Vector Based Anomaly Detection for Large-Scale Logs in the Internet of Things," Sensors, vol. 20(9), Apr. 26, 2020 (Apr. 26, 2020), p. 2451, XP093010553, DOI: 10.3390/s20092451.

* cited by examiner

DETERMINATION OF DENSE EMBEDDING TENSORS FOR LOG DATA USING BLOCKWISE RECURRENT NEURAL NETWORKS

BACKGROUND

Artificial neural networks, sometime referred to as neural networks (NNs), are computing systems inspired by the biological neural networks associated with a biological brain. An NN is based on a collection of connected units or nodes called artificial neurons, which loosely model the neurons in a biological brain. Each connection, similar to the synapses in a biological brain, can support a transmission of a signal to other neurons. An artificial neuron may receive a signal, processes the signal, and/or transmit the signal to other neurons. In a recurrent neural network (RNN), there may be feedback loops that connect an output of an artificial neuron to an input of the same artificial neuron in a next time step, thereby forming a memory for the artificial neuron. Additionally, RNNs may support variable length inputs. In other words, an input to an artificial neuron can vary in size, rather than being a single, fixed size as occurs with, for example, deep neural networks.

The "signal" at a connection is a real number, and the output of each neuron is computed by some non-linear function of the sum of its inputs. The connections may be referred to as edges. Neurons and edges typically have a weight that adjusts as learning proceeds. The weight increases or decreases the strength of the signal at a connection. Neurons may have a threshold such that a signal is sent only if the aggregate signal crosses that threshold. Typically, neurons are aggregated into layers. Different layers may perform different transformations on their inputs. Signals may travel from the first layer (the input layer) to the last layer (the output layer) (e.g., possibly after traversing the layers multiple times).

Dense embedding tensors are a component of NNs and other artificial intelligence machine learning models. Dense embedding tensors can be used to represent high-dimensional data in a compact and meaningful way, thereby allowing a model to efficiently learn from input data. For example, dense embedding tensors may be used to represent categorical variables, such as words in natural language processing or user identifiers in recommendation systems. The dense embedding tensors, which may sometimes be referred to as tensors, are learned through an optimization process that maps categorical variables to a lower-dimensional vector space, where each dimension represents a feature or attribute of a variable. The resulting dense embedding tensors can capture the relationships and similarities between the categorical variables, which can be used to improve an accuracy of a model in tasks such as recommendation, anomaly detection, or root cause analysis, among other examples. Learned embeddings can also be used to visualize and interpret learned features of a model, which may provide information regarding how a model is making prediction.

SUMMARY

Some implementations described herein relate to a device. The device may include one or more memories and one or more processors coupled to the one or more memories. The one or more processors may be configured to receive information associated with a software log corpus, wherein the software log corpus includes log data from a test device, and wherein the log data includes alphanumeric formatted measurement data and computer code. The one or more processors may be configured to identify blocks in the software log corpus, a block being an alphanumeric formatted section of the software log corpus representing a configured amount of information content of the software log corpus. The one or more processors may be configured to encode the blocks to generate encoded blocks using a set of vocabulary tokens that are based on alphanumeric characters included in the software log corpus, wherein the encoded blocks is associated with a numeric format. The one or more processors may be configured to generate a set of input sequences and a set of target sequences based on the encoded blocks and a statistical block length associated with the blocks, wherein the set of target sequences are shifted versions of the set of input sequences. The one or more processors may be configured to generate a training dataset for embedding computation based on combining the set of input sequences and the set of target sequences into a tuple, partitioning the tuple into batches, and shuffling the batches to obtain the training dataset. The one or more processors may be configured to train a recurrent neural network (RNN) to learn a set of dense embedding tensors using a set of shuffled data tensors associated with the training dataset and the encoded blocks, the set of dense embedding tensors being based on the training dataset. The one or more processors may be configured to output information associated with the set of dense embedding tensors.

Some implementations described herein relate to a method. The method may include receiving, by a device, information associated with a software log corpus, wherein the software log corpus includes log data from a test device, and wherein the log data includes alphanumeric formatted measurement data and computer code. The method may include identifying, by the device, blocks in the software log corpus, a block being an alphanumeric formatted section of the software log corpus representing a configured amount of information content of the software log corpus. The method may include encoding, by the device, the blocks to generate encoded blocks using a set of vocabulary tokens that are based on alphanumeric characters included in the software log corpus, wherein the encoded blocks are associated with a numeric format. The method may include generating, by the device, a set of input sequences and a set of target sequences based on the encoded blocks and a statistical block length associated with the blocks, wherein the set of target sequences are shifted versions of the set of input sequences. The method may include generating, by the device, a training dataset for embedding computation based on combining the set of input sequences and the set of target sequences into a tuple, partitioning the tuple into batches, and shuffling the batches to obtain the training dataset. The method may include generating, by the device, a set of multi-dimensional dense embedding tensors using the training dataset and the encoded blocks. The method may include outputting, by the device, information associated with the set of multi-dimensional dense embedding tensors.

Some implementations described herein relate to a non-transitory computer-readable medium that stores a set of instructions. The set of instructions, when executed by one or more processors of a device, may cause the device to receive information associated with a software log corpus, wherein the software log corpus includes log data from a test device, and wherein the log data includes alphanumeric formatted measurement data and computer code. The set of instructions, when executed by one or more processors of the device, may cause the device to identify blocks in the software log corpus, a block being an alphanumeric formatted section of the software log corpus representing a configured amount of information content of the software log corpus. The set of instructions, when executed by one or more processors of the device, may cause the device to encode the blocks to generate encoded blocks using a set of vocabulary tokens that are based on alphanumeric characters included in the software log corpus, wherein the encoded blocks are associated with a numeric format. The set of instructions, when executed by one or more processors of the device, may cause the device to generate a set of input sequences and a set of target sequences based on the encoded blocks and a statistical block length associated with the blocks, wherein the set of target sequences are shifted versions of the set of input sequences. The set of instructions, when executed by one or more processors of the device, may cause the device to generate a training dataset for embedding computation based on combining the set of input sequences and the set of target sequences into a tuple, partitioning the tuple into batches, and shuffling the batches to obtain the training dataset. The set of instructions, when executed by one or more processors of the device, may cause the device to generate a set of multi-dimensional dense embedding tensors using the training dataset and the encoded blocks. The set of instructions, when executed by one or more processors of the device, may cause the device to train an RNN using the training dataset and based on one or more hyperparameters to obtain a set of embedding tensors associated with an embedding layer of the RNN. The set of instructions, when executed by one or more processors of the device, may cause the device to perform an artificial intelligence operation using the set of embedding tensors to obtain information associated with new log data.

DETAILED DESCRIPTION

Figure 1A:
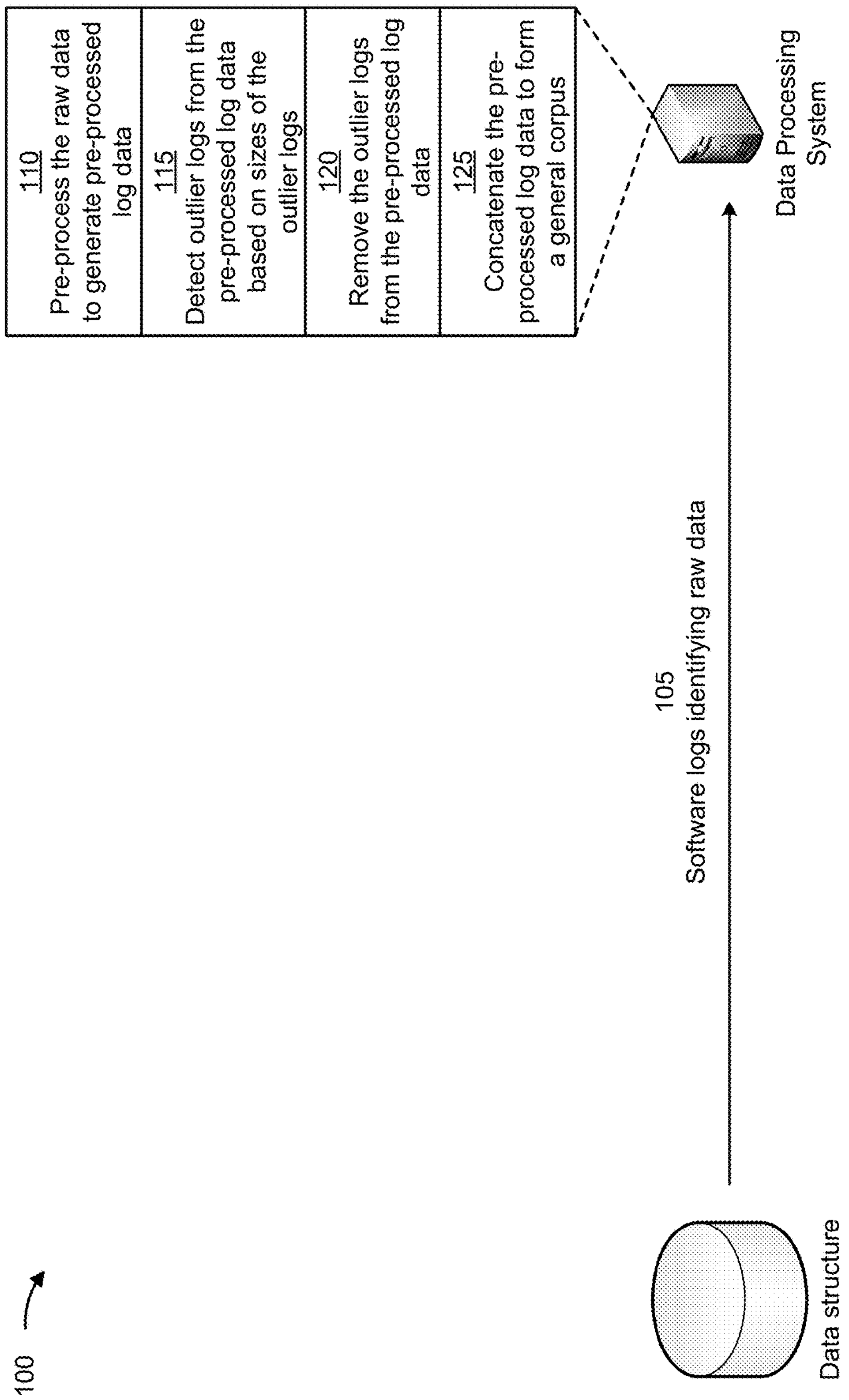
FIGS. 1A-1I are diagrams of an example implementation associated with determination of dense embedding tensors for log data using blockwise recurrent neural networks (RNNs).

The following detailed description of example implementations refers to the accompanying drawings. The same reference numbers in different drawings may identify the same or similar elements.

Network and/or system testing solutions play a vital role in the development and implementation of new technologies before such technologies can be used by the wider public. Testing of a network and/or system generates large quantities of software logs that include significant amounts of information associated with network or system states, network or system responses, network or system status, interactions with the network or system, runtime information, and/or performance of the network or system, among other examples. As an example, 5G or 6G (or other radio access technologies) telecommunications network testing solutions may generate software logs associated with information collected from performing tests on the network.

The software logs may include millions of lines of coded and uncoded text that is not readily understandable by unskilled people. There are experts at certain institutions that rely on extensive knowledge and experience to interpret the software logs. A log mining process is utilized for failure discovery and diagnosis, security, classification, and/or prediction, among other examples, based on the software logs. The software logs are also a source of diagnosis when malfunctions occur. When a malfunction occurs, experts may analyze the software logs to diagnosis a cause of the malfunction.

The current techniques for analyzing software logs are non-systematic, inefficient, and result in shortcomings and bottlenecks. Not only do the current techniques require allocation and consumption of a large quantity of resources on a repeated basis, but the current techniques also fail to utilize valuable historical data from past resolved cases. Therefore, current techniques for analyzing software logs consume computing resources (e.g., processing resources, memory resources, and/or communication resources), and/or networking resources, among other examples, associated with incorrectly analyzing the software logs, making incorrect modifications to the network or system based on the incorrectly analyzed software logs, and/or correcting the incorrect modifications to the network or system, among other examples.

In some cases, a machine learning model or an artificial intelligence (AI) model may be utilized to extract or obtain information from the software logs. However, machine learning or AI models require inputs to be in a purely numeric format (e.g., the machine learning or AI models may run using numbers or numerical data as inputs). The software logs generated from testing, as described above, may be in a text-type format including alphanumeric characters (e.g., letters, numbers, symbols, and/or other characters). Therefore, the software logs need to be converted from the text-type format (e.g., an alphanumeric format) to a numeric format in order to be analyzed by a machine learning model or an AI model.

A success rate of a conversion from a text-type format (e.g., an alphanumeric format) to a numeric format is dependent on the efficiency of the transition from a text space to a numerical space and retaining meaningful information after the conversion. Current techniques, such as natural language processing (NLP), are designed for the different contexts and/or languages and have unequal and often completely distinct structures and characteristics depending on the context or language being converted to the numerical space. However, the software logs do not have traditional structures, languages, words, and/or other structures that may be expected with typical text-type formats (e.g., that may be associated with spoken languages). As a result, current techniques, such as NLP, may fail to maintain meaningful information or patterns in the software logs when converting the software logs to the numerical space. This may cause machine learning or AI operations that are performed using the converted numerical data to produce incorrect, irrelevant, inaccurate, and/or misleading outputs, among other examples.

Some implementations described herein enable determination of dense embedding tensors for log data (e.g., for software log data) using blockwise recurrent neural networks (RNNs). For example, a data processing system may obtain a training corpus from a set of concatenated pre-processed log data (e.g., a set of pre-processed software logs) having an alphanumeric format (e.g., a text-type format). In some implementations, the data processing may detect and remove outlier data sets (e.g., outlier log files) from the set of pre-processed software logs based on a size (e.g., a quantity of lines) associated with the outlier data sets. The data processing system may encode the training corpus to obtain a set of encoded data using a set of vocabulary tokens that are based on the alphanumeric characters included in the training corpus. The encoded data may have a numeric format. The data processing system may calculate a sequence length based on a statistical parameter associated with the training corpus. For example, the sequence length may be used to determine a length or size of input sequences to be used to train an RNN, as described in more detail elsewhere herein. The sequence length may be adaptive or dynamic and may change based on the data included in the software logs.

The data processing system may generate a set of input sequences and a set of target sequences based on the set of encoded data. Each input sequence, from the set of input sequences, and each target sequence, from the set of target sequences, may have a length equal to the sequence length. The data processing system may generate a training data set based on combining the set of input sequences and the set of target sequences into a tuple, partitioning the tuple into batches based on a batch size, and shuffling information included in the batches to obtain the training data set. Shuffling the information may decrease a likelihood of overfitting when training the RNN. The data processing system may train an RNN using the training data set and based on one or more hyperparameters to obtain a set of dense embedding tensors associated with an embedding layer of the RNN. The data processing system may perform an artificial intelligence operation using the set of dense embedding tensors to obtain information associated with a software log data (e.g., information associated with the concatenated pre-processed log data).

As a result, the data processing system may transform text data (e.g., included in the software logs) into numerical data in a manner designed for the complex and sophisticated software logs. The data processing system may convert the text data into dense high dimensional tensors (e.g., the embedding tensors), where each dimension in the tensor space represents a feature extracted from the text data. Therefore, the features of the text data may be extracted without any human input defining the features. The implementations described herein provide an efficient, scalable, and adjustable technique for converting text data included in complex and sophisticated software logs into numeric data while maintaining all features (e.g., meaningful information) of the text data. A machine learning model or an AI model may be trained using the high dimensional tensors (e.g., the dense embedding tensors) to obtain information associated with the software logs. For example, the machine learning model or an AI model may be trained to classify a software log or to find similar software logs based on the high dimensional tensors (e.g., the dense embedding tensors). As a result, meaningful information (e.g., a classification or a similarity analysis) may be obtained for a software log without requiring the information in the software log to be analyzed or interpreted (e.g., by a user or a device). This conserves significant time associated with analyzing the software logs. Additionally, this conserves computing resources, and/or networking resources, among other examples that would otherwise have been consumed in analyzing the software logs, making incorrect modifications to a network or system based on incorrectly analyzed software logs, and/or correcting the incorrect modifications to the network or system, among other examples.

FIGS. 1A-1I are diagrams of an example implementation 100 associated with determination of dense embedding tensors for log data using blockwise RNNs. As shown in FIGS. 1A-1I, example implementation 100 includes a data processing system, and a data structure. The data structure may include a database, a table, and/or a list, among other examples, that stores software logs. These devices are described in more detail below in connection with FIG. 2 and FIG. 3.

As shown in FIG. 1A, and by reference number 105, the data processing system may receive software logs identifying raw data. The software logs may be generated by a system or a network (e.g., a telecommunications network), among other examples. For example, a testing system may perform tests on components of a telecommunications network. The testing of the telecommunications network generates large quantities of software logs that include significant amounts of raw data associated with network states, network responses, network status, interactions with the network, runtime information, and/or performance of the network, among other examples. The software logs may include millions of lines of coded and uncoded text that is not readily understandable by unskilled people. The software logs may include historical test cases as well as resolved and reported cases. Each entry within the software logs may include static fields and dynamic fields, often in free-form natural language text that cannot be readily understood. The static fields may include text that is not variable, remains unchanged during an occurrence of an event, and is related to an event type. The dynamic fields may include text that is variable, that differs from one case to another case, and may be assigned at run-time. A system configuration set by the service provider may determine a form and content of each software log entry associated with a logged event. Although examples may be described herein in connection with telecommunications software logs, it should be understood that the techniques and implementations described herein may be similarly applied to software logs generated by other systems or networks, such as a data center system, a network routing system, or any other system or network.

The testing system and/or the telecommunications network may store the software logs in the data structure. In some implementations, the data structure may be maintained and/or managed by a service provider associated with the telecommunications network. The data processing system may provide or transmit, to the data structure, a request for the software logs and may receive the software logs from the data structure based on the request. In some implementations, the data processing system may receive a path identifying a location of the software logs at initialization. The data processing system retrieve the software logs from the identified path and may process the software logs. The software logs may be in a text-type format (e.g., may be in a .txt format). For example, the software logs may include alphanumeric characters and/or other characters or symbols.

As shown by reference number 110, the data processing system may pre-process the raw data included in the software logs to obtain a set of pre-processed log data. For example, the data processing system may convert the raw data from a markup language format to a text format, to generate text data. For example, the raw data may be provided in a markup language format, such as hypertext markup language (HTML) format. The data processing system may convert the raw data from the markup language format to the text format (e.g., the text data) for further processing. The raw data may be converted or transformed into the text data, which is unified clean data that is compatible with an RNN model. The data processing system may not perform processing on the actual raw data. The data processing system may read the raw data from the data structure, may process the raw data, and may write new clean data to a data structure associated with the data processing system. In this way, the data processing system may ensure that the valuable actual raw data is still available for any future purposes.

In some implementations, the static fields, the dynamic fields, and elements of each within the software logs may be separated by a variety of delimiters, such as semicolons, commas, brackets, white space, next lines, and/or the like. The data processing system may eliminate the delimiters from the software logs so that the clean data may be processed by the RNN model. For example, the data processing system may identify delimiters, regular expressions, stop words (e.g., selected from one or more stop words libraries or data structures), unwanted lines, or other configured types of data to enable processing of remaining data with reduced resources. If the delimiters are not removed or replaced, performance of the RNN model may be reduced. Furthermore, if the delimiters are not removed, allocation of labeled data for training the RNN model may be much more challenging and less effective. The data processing system may perform one or more other pre-processing operations, such as: changing name strings of the text data to a new name; extracting pre-log data, associated with test cases, from the text data; removing files with less than a threshold quantity of lines from the text data to generate modified text data; extracting user equipment (UE) data, associated with a particular quantity of UEs, from the modified text data; decoding radio resource control (RRC) messages in the modified text data to generate decoded RRC messages; extracting marker data, associated with particular markers, from the modified text data; removing files associated with timestamps and a first set of the test cases from the modified text data to generate further modified text data; extracting test case data, associated with a second set of the test cases, from the further modified text data; and/or removing, from the further modified text data, lines that include particular syntax (e.g., "python.exe," syntax indicating that a test executed and passed, syntax indicating that an action is waiting to be performed); among other examples.

The output of the pre-processing operation(s) may include a data structure with a file name identifier column, a verdict column, and/or a quantity of UEs column, among other examples. The verdict column may include entries for binary values (e.g., "1" for Pass or "0" for Fail) indicating whether a software log was associated with a pass test case or a failure test case (e.g., "PASS: The test ran successfully and passed" or "FAIL: The test ran to completion, test conditions not met"). The quantity of UEs columns may include entries that associate the quantity of UEs data for validation purposes. For example, if an objective is to extract single UE cases and perform the pre-processing tasks on the single UEs, the quantity of UEs column may include a value of one. In some implementations, the data processing system may extract one or more characteristics of a command log or software log. For example, the data processing system may identify a set of statistical metrics regarding the command log or software log or identify a sub-log within a software log (e.g., a multiplexing log), among other examples.

As shown by reference number 115, the data processing system may detect and remove one or more outlier data sets (e.g., one or more files) from pre-processed log data. For example, the data processing system may detect the one or more outlier data sets (e.g., one or more files) from pre-processed log data based on a length or a size of the one or more outlier data sets. In other words, the data processing system may detect one or more data sets (e.g., one or more files) that are outliers in terms of size as compared to the rest of the pre-processed log data. The data processing system may detect the one or more outlier data sets (e.g., one or more files) from pre-processed log data using an inter-quartile range (IQR) technique, and/or a standard deviation technique, among other examples. For example, the data processing system may identify data sets, from the pre-processed log data, having a size that is outside of a threshold range (e.g., the $25^{th}$ to $75^{th}$ percentile of the size of the pre-processed log data).

For example, an IQR technique may include detecting the $25^{th}$ percentile and the $75^{th}$ percentile of the pre-processed log data (e.g., in terms of size). This may be represented via a box and whisker plot. The data processing system may detect data sets (e.g., files) having a size that is in a percentile less than the $25^{th}$ percentile of the pre-processed log data. Similarly, the data processing system may detect data sets (e.g., files) having a size that is in a percentile greater than the $75^{th}$ percentile of the pre-processed log data. As shown by reference number 120, the data processing system may identify such data sets (e.g., files) as outliers and may remove the outlier data sets from the set of pre-processed log data. This may reduce training time for an RNN (e.g., as explained in more detail elsewhere herein). Additionally, this may reduce a likelihood of overfitting or incorrect training that may result from using pre-processed log data having an unusually small or large size, thereby improving a performance of the training of the RNN by removing such outlier data sets.

As shown by reference number 125, the data processing system may concatenate (e.g., combine or link together) the pre-processed log data (e.g., after removing the outlier data sets) to obtain a set of concatenated pre-processed log data. The set of concatenated pre-processed log data may form a general corpus for the RNN. Similar to the software logs containing the raw data, the general corpus may be associated with an alphanumeric format, such as a text-type format. For example, the general corpus may be a file (or multiple files) having a .txt format. In some implementations, the general corpus may have a subset designated as a training corpus, which may be a subset of blocks $B_i$ of the general corpus, as described herein.

Figure 1B:
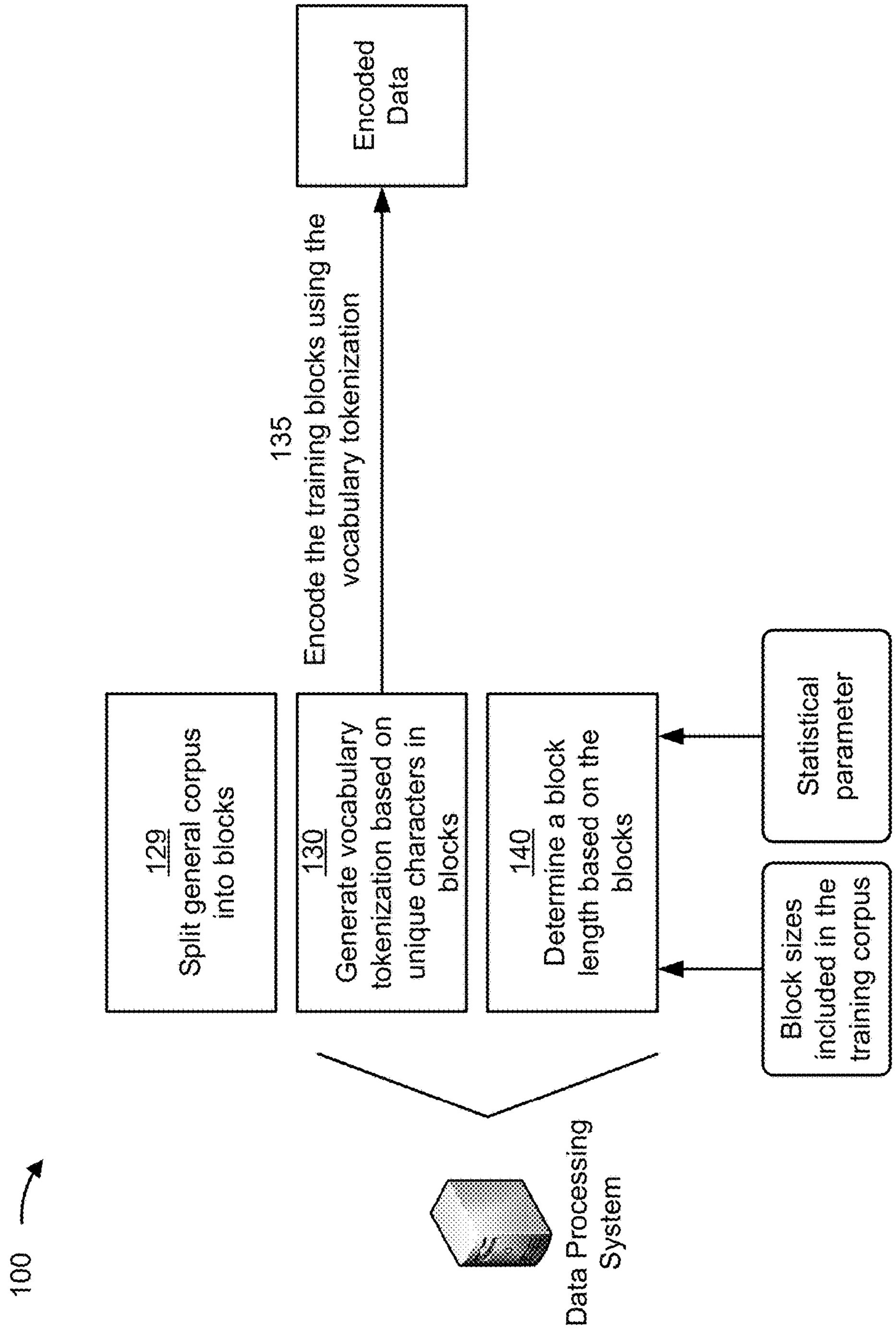

As shown in FIG. 1B, the data processing system may perform an encoding operation for the set of concatenated pre-processed log data. For example, as shown by reference numbers 129 and 130, the data processing system may divide the general corpus into a set of blocks and generate a set of unique tokens ($T_i$) (e.g., vocabulary tokens) for each block that are based on alphanumeric characters included in the set of blocks. For example, the data processing system may perform a tokenization of the set of blocks.

Here, rather than the data processing system using each alphanumeric character of a block as a token (or each word or program code command as a token), the data processing system can use each block (or a subset within a block) as a token. As described below, the data processing system may use a sliding window to lock at some quantity of blocks before and after each block to train embeddings to determine a semantic meaning of each block (e.g., with respect to, for example, classifying test results from a software log).

The data processing system may scan and/or analyze the general corpus to generate the set of blocks and identify tokens (e.g., vocabulary tokens). For example, the tokens (e.g., vocabulary tokens) may be unique character included in the training corpus. As used herein, "unique characters" may refer to each character (e.g., letter, number, symbol, or other character) that appears in the training corpus at least once. Some tokens may relate to groups of unique characters, such as a group of letters, numbers, symbols, or a combination thereof that, collectively, forms a unique multi-character string.

The data processing system may scan a block to identify characters that appear in the block at least once. Each character that appears in a block at least once (e.g., the unique characters in the general corpus) may form the set of vocabulary tokens. Using the unique characters in the blocks as the tokens for tokenization of the training corpus may simplify the tokenization operation because the quantity of unique characters included in the general corpus (e.g., in the software logs) may be significantly smaller than other character lists used for tokenization, such as American Standard Code for Information Interchange (ASCII) table of 256 characters (e.g., 8 bits) or an ASCII table of 128 characters (e.g., 7 bits). For example, a quantity of unique characters in the general corpus may be in the range of 90 to 100 characters. Therefore, using the unique characters in the training corpus as the vocabulary tokens may conserve processing resources and/or time associated with encoding or tokenizing the training corpus.

The data processing system may generate an array that can be used to convert between the vocabulary of a block (or a set of blocks) (e.g., the unique characters) and index values (e.g., a numeric space). The array may enable a two-sided system in which the data processing system is enabled to convert or encode the text in the training corpus to a numeric space (e.g., using index values) and to convert the numeric space (e.g., the index values) to an alphanumeric space (e.g., the text).

As shown by reference number 135, the data processing system may encode the set of blocks to obtain a set of encoded blocks (EB). For example, the data processing system may encode the set of blocks using the set of vocabulary tokens that are based on alphanumeric characters included in the set of blocks (e.g., using the array generated as described above). The data processing system may encode the entire training corpus (e.g., to generate encoded blocks (EB) of the training corpus). Alternatively, the data processing system may encode a subset of the training corpus. The length or size of the encoded blocks ($|l_{eb}|$) of the training corpus may be less than the length of size of the general corpus ($l_{gc}$).

In some implementations, the data processing system may encode the general corpus to obtain a set of encoded blocks. In some implementations, the data processing system may detect one or more outlier encoded blocks from the set of encoded data based on a size of the one or more outlier encoded blocks. For example, the data processing system may utilize IQR or a standard deviation technique to identify encoded data blocks that have a size that is outside of a threshold range. The data processing system may remove any identified outlier encoded data blocks from the set of encoded data blocks associated with the training corpus.

As shown by reference number 140, the data processing system may calculate or determine a block length ($I_B$) based on a statistical parameter associated with the training corpus. The block length may be adaptive to the data or information included in the training corpus (e.g., may be based on the data or information included in the training corpus). In this way, the block length of blocks that form a training data set for the RNN, as explained in more detail elsewhere herein, may have a length that is adapted to the data or information included in the training corpus. This may reduce, or eliminate, the need for the data processing system to perform techniques to ensure blocks that are input to the RNN all have the same length, such as a zero padding technique, or another technique. This, in turn, conserves processing resources and reduces a complexity associated with training the RNN.

To calculate the block length, the data processing system may detect a set of data blocks from the training corpus based on one or more indicators included in the alphanumeric characters included in the training corpus. The indicators may be identifiers, characters, or other symbols that indicate breaks or partitions between meaningful information in the software logs. For example, the one or more indicators may be command indicators. For example, in a telecommunications software log, the blocks may be text or information included between indications and confirmations as indicated by the software log (e.g., the software log may include "I:" to show an indication starting an input or test information and a "C:" to indicate a confirmation of the end of meaningful information). A block may be detected as the information or text between the "I:" and the "C:" included in the training corpus. The data processing system may determine a size or length of each data block included in the set of data blocks. In some implementations, the data processing system may remove any data blocks, from the set of data blocks, that are associated with an outlier length (e.g., identified using IQR or another technique in a similar manner as described in more detail elsewhere herein). The data processing system may calculate a statistical parameter based on sizes of data blocks included in the set of data blocks to obtain the block length. In this way, the block length may be adapted to a size of blocks of meaningful information included in the training corpus. The block length may be used to generate a set of training blocks for the RNN (e.g., from the encoded blocks of the set of blocks of the general corpus). This may improve a performance of the training of the RNN (e.g., as compared to using a fixed value as the sequence length) because the training blocks have lengths or sizes that are adapted to the information included in the training corpus.

For example, the data processing system may calculate the block length according to the following equation:

$$l_B = \sum_{i=1}^{n_B-n_o} \frac{|B_i|}{n_B - n_o}$$

where $l_B$ is the sequence length, $n_B$ is the quantity of detected blocks $B_i$, and $n_o$ is the quantity of outlier blocks (e.g., blocks with outlier lengths). For example, in a first algorithmic process, the data processing system may detect $n_B$ blocks $B_i$ in the general corpus. The data processing system may calculate a length or size, $|B_i|$, of each detected block for i=1 to $i=n_B$. The data processing system may detect $n_o$ outlier blocks based on the calculated lengths or sizes (e.g., using IQR or another technique). The data processing system may remove the $n_o$ outlier blocks from the set of data blocks. The data processing system may calculate $l_B$, as an output of the first algorithmic process, using the equation above. In the equation above, the statistical parameter used to calculate the block length $I_B$ is an average of the lengths or sizes of the detected blocks (e.g., with outlier blocks removed). In some other implementations, a different statistical parameter may be used to calculate the block length, such as a median length or size of the detected blocks, a mode of the length or size of the detected blocks, and/or a weighted average of the length or size of the detected blocks (e.g., where certain blocks have a different weight applied to the length or size when calculating the average), among other examples. The data processing system may determine a total quantity of training blocks, $|B|$, based on a length of the encoded blocks of the set of blocks of the general corpus dived by the calculated sequence length. In other words, $|B|=l_c/l_B$. The data processing system may, as described in more detail below, use a batch size $|b|$ for each epoch of RNN training, resulting in the data processing system performing training of $|B|/|b|$ sets for each epoch of RNN training to be completed.

Figure 1C:
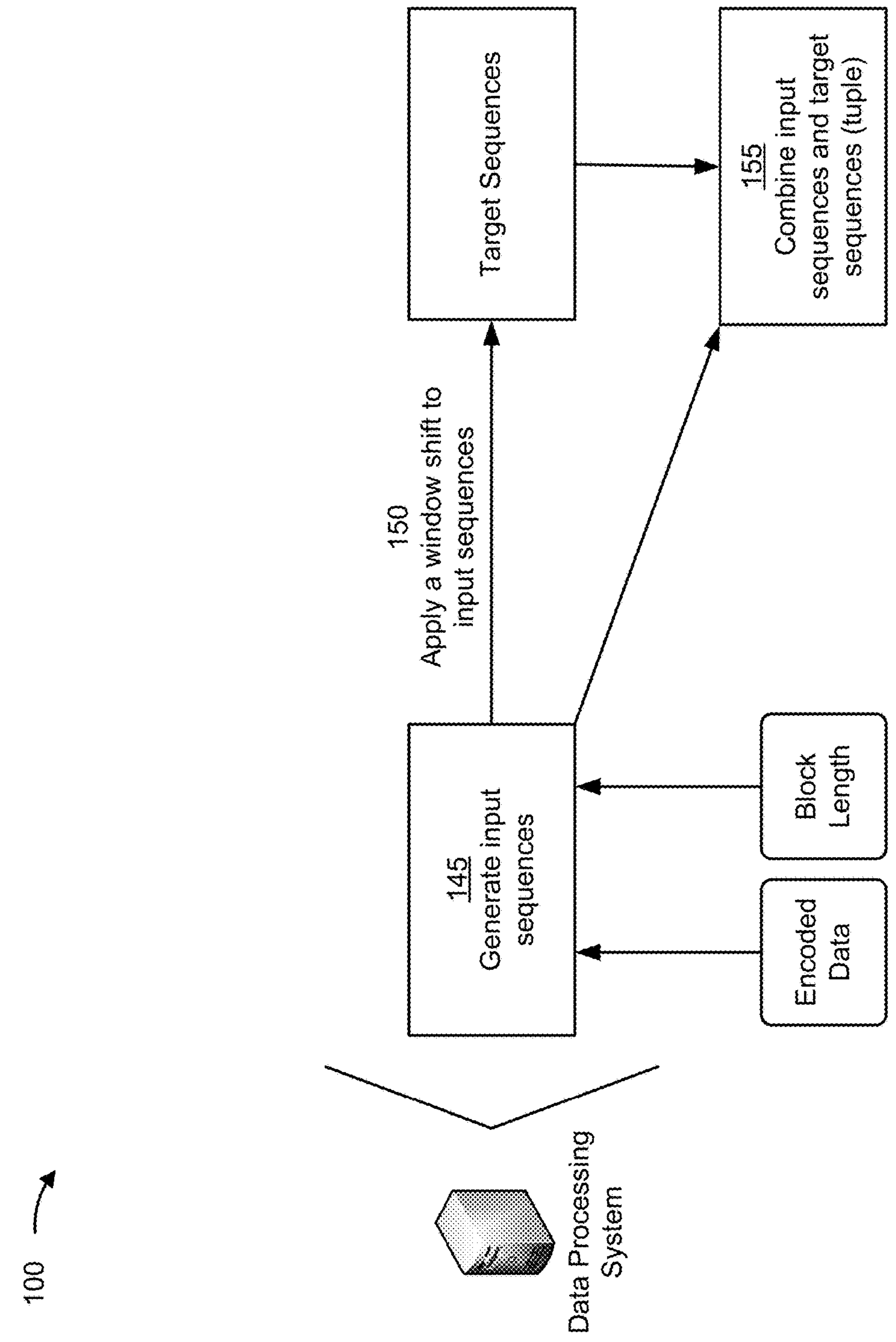

As shown in FIG. 1C, the data processing system may generate training sequences (e.g., a set of training data) for the RNN based on the encoded blocks (e.g., the encoded blocks of the set of blocks of the general corpus). For example, as shown by reference number 145, the data processing system may generate a set of input sequences. For example, based on one or more tensor slices and the encoded data (e.g., the encoded blocks) from the training corpus, the data processing system may generate the set of input sequences. The one or more tensor slices may be generated based on an open-source program, such as the program tf.data.Dataset.from_tensor_slices from the open-source platform TENSORFLOW, among other examples. For example, the data processing system may generate input sequences $B_i \in \{B_i\}$, where $i \in 1:|B|$. Each input sequence may have a length equal to the block length $l_B$ (e.g., calculated as described above). In other words, the data processing system may partition the encoded data (e.g., the encoded blocks of the set of blocks of the general corpus) into $|B|$ input sequences, each input sequence having a length $l_B$.

As shown by reference number 150, the data processing system may apply a window shift (e.g., a time step) $l_w$ to the input sequences to generate a set of target sequences. The unit of length (e.g., a shift value) of the window shift (e.g., $l_w$) may be in terms of a quantity of characters. In some implementations, the unit of length (e.g., a shift value) of the window shift (e.g., $l_w$) may have a value of 1 (one). In some implementations, the unit of length of the window shift may be greater than 1, such as 2, 3, or another larger value. Based on applying the window shift to the set of input sequences, the data processing system may obtain a set of target sequences $B_t \in \{B_t\}$, where $t \in 1:|B|$. Therefore, the set of target sequences may be shifted versions of the set of input sequences.

Each target sequence may have a length equal to the block length $l_B$ (e.g., calculated as described above). The input sequences and the target sequences may each have the same size (e.g., the block length $l_B$). In some implementations, for each input sequence, there may be one corresponding target sequence.

As shown by reference number 155, the data processing system may combine the set of input sequences and the set of target sequences (e.g., into a tuple $(B_i, B_t)$, i, $t \in 1:|B|$). Because the set of input sequences and the set of target sequences each have the same length (e.g., $l_B$), the data processing system may not be required to perform one or more operations to ensure the set of input sequences and the set of target sequences have the same length when combining the set of input sequences and the set of target sequences to form the tuple. For example, if some input sequences or target sequences were different lengths or sizes, the data processing system may need to perform one or more operations, such as a zero padding operation or a discarding operation, to ensure the sequences are all the same length or size. Therefore, by ensuring that the set of input sequences and the set of target sequences each have the same length (e.g., $|l_{Bi}|=|l_{Bt}|=l_B$), the data processing system may reduce a complexity and/or conserve processing resources associated with generating the training sequences for the RNN.

Figure 1D:
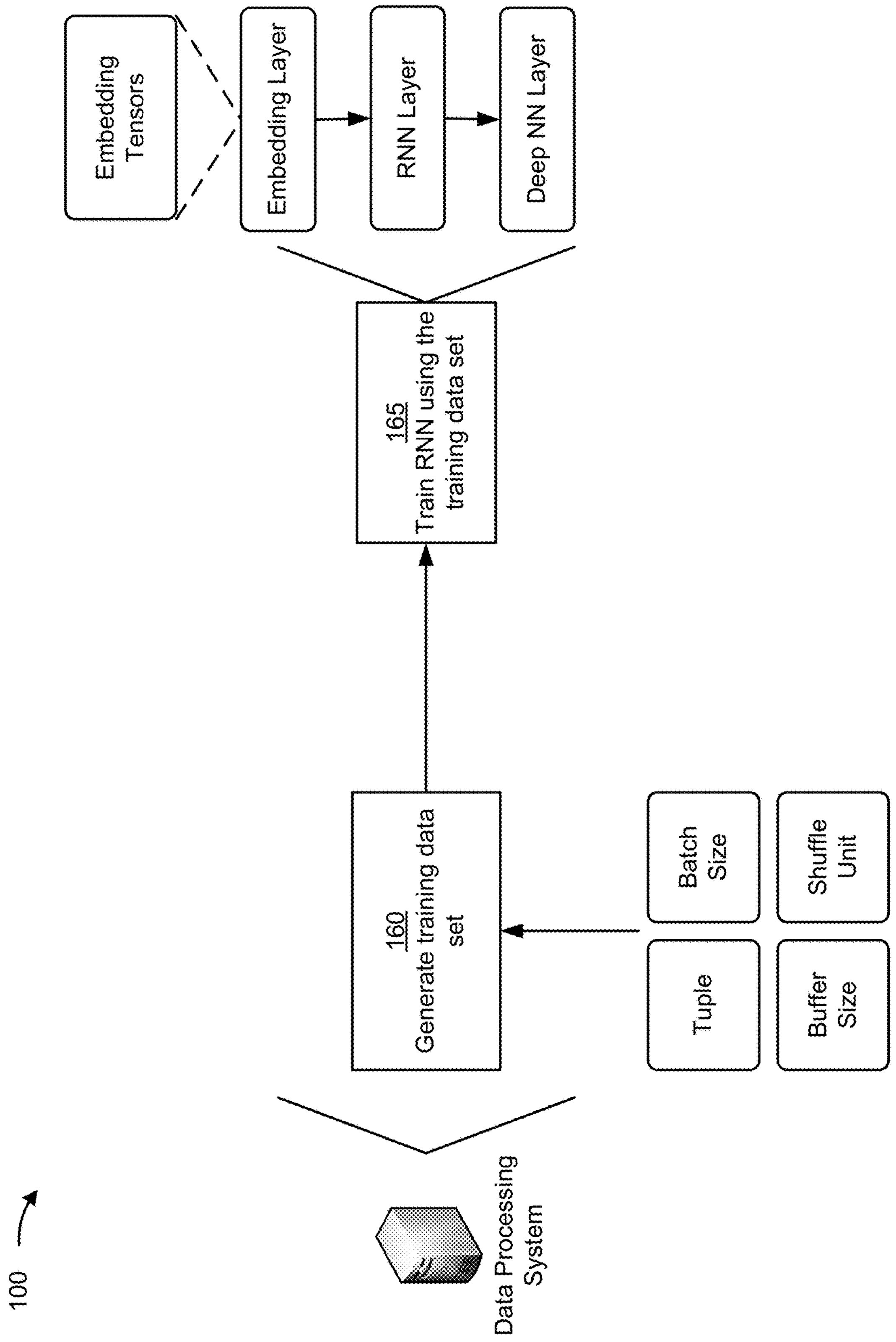

As shown in FIG. 1D, and by reference number 160, the data processing system may generate a training data set for the RNN. For example, the data processing system may generate the training data set (e.g., a set of training sequences) based on the tuple (e.g., the combined set of input sequences and set of target sequences). Additionally, the data processing system may generate the training data set based on a batch size $|b|$, as described above. The batch size may indicate a size of one or more batches for training the RNN. For example, for a batch size $|b|$, the data processing system may need to pass through $|B|/|b|$ training sets for a single epoch to be completed. An epoch may refer to a single pass through an entire training data set when training a machine learning model, such as the RNN. In some implementations, the data processing system may generate the training data set based on a buffer size (e.g., an amount of memory that can be stored, associated with the training data set, for training the RNN). For example, the data processing system may generate the training data set to ensure that a size of the training data set, or a size of a given batch associated with the training data set, does not exceed the buffer size.

The data processing system may partition the tuple (e.g., including the set of input sequences and the set of target sequences) into one or more batches based on the batch size $|b|$. Additionally, the data processing system may shuffle data included in each batch based on a shuffle unit. For example, the data processing system may run each batch through a shuffle unit or a randomizer to shuffle the data included in each batch. This may reduce a likelihood of overfitting when training the RNN (e.g., ensure that the RNN does not "overfit" to one specific section of the data included in the training corpus). Based on shuffling information included in the batches, the data processing system may obtain the training data set, which may also be referred to herein as shuffled data tensors (SDT). A shuffled data tensor may have a size of $((|b|, l_B), (|b|, l_B))$.

For example, in a second algorithmic process, the data processing system may create tensor slices (TS) from encoded blocks (EB) using TENSORFLOW program tf.data.Dataset.from_tensor_slices. The data processing system may create batch sequences using the block length $l_B$ using TENSORFLOW program TS.batch($l_B$+1, drop_remainder=True). The data processing system may generate input sequences $B_i \in \{B_i\}$, $i \in 1:|B|$ of length $|l_{Bi}|=l_B$ using TENSORFLOW program seq[:−1]. The data processing system may apply a window shift unit of length $l_w$. The data processing system may generate target sequences $B_t \in \{B_t\}$, $t \in 1:|B|$ of length $|l_{Bt}|=l_B$ using TENSORFLOW program seq[1:]. The data processing system may generate, based on $B_i$ and $B_t$, a set of tuples $(B_i, B_t)$, i, $t \in 1:|B|$. The data processing system may use a batch size of $|b|$ and a given buffer size to shuffle the generated data. The data processing system may provide, as an output of the second algorithmic process, SDTs of size $((|b|, l_B), (|b|, l_B))$.

As shown by reference number 165, the training data set (e.g., the SDT) may be used to train an RNN. In another example, the SDT may be used to train a deep neural network (DNN) such as a sequential DNN. In this case, the sequential DNN may include an RNN, as shown. The data processing system may train the RNN using the training data set and based on one or more hyperparameters to obtain a set of embedding tensors associated with an embedding layer of the RNN. The one or more hyperparameters may include a quantity of epochs associated with training the RNN, a size associated with the set of vocabulary tokens (|V|), the batch size (|b|), an embedding dimension size ($d_E$), and/or a quantity of neurons or hidden units associated with an RNN layer of a sequential DNN ($n_u$), among other examples. In other words, training an RNN may be a step of training a sequential DNN. In some implementations, the data processing system may receive a user input indicating values for one or more of the hyperparameters. For example, the data processing system may receive an indication of respective values for the one or more hyperparameters. Additionally, or alternatively, the data processing system may determine values for one or more of the hyperparameters.

FIG. 1D (and FIG. 1I), shows an example of training a DNN, which includes training an RNN layer as described herein. The DNN may include an embedding layer as a first layer (e.g., an input later), an RNN layer as a second layer, and a dense NN layer as a third layer (e.g., an output layer). The embedding dimension size ($d_E$) may define a quantity of features that the DNN may capture and compute automatically (e.g., features of the software logs). A large value for $d_E$ may result in a large tensor space which may cause overfitting and increase processing resources required for training. A small value for $d_E$ may result in a small-scale and poor tensor space, which typically induces bias as a result of a simplistic representation of the features of the software logs. Therefore, the value for $d_E$ may be selected to balance between the two extremes described above. In some implementations, the value for $d_E$ may be between 50 and 125, or more specifically, between 64 and 100. The input hyperparameters for the embedding layer may be the size associated with the set of vocabulary tokens, the batch size, and/or the embedding dimension size (e.g., may be (|V|, |b|, $d_E$)), among other examples.

Following the embedding layer, an RNN layer may be added to the DNN. One benefit of using an RNN is that RNNs use an order of data as an input, as described above. In this case, because blocks, within software logs, may have a relationship based on an order of the blocks, using an RNN enables capturing of that relationship when analyzing the blocks. The RNN may be a long short-term memory (LSTM) RNN layer or a gated recurrent unit (GRU) RNN layer, among other examples. The type of RNN layer (e.g., LSTM or GRU, among other examples) may be another hyperparameter associated with the DNN. The RNN network layer may be associated with input hyperparameters, from the one or more hyperparameters, including a quantity of neurons (e.g., artificial neurons) or hidden units ($n_u$), and a recurrent initializer, among other examples. The quantity of neurons (e.g., artificial neurons) or hidden units ($n_u$) may define a dimension of a vector that is passed from the RNN layer to another layer. Similar to the value for $d_E$, a value of $n_u$ may be selected to balance between overfitting (e.g., when the value of $n_u$ is too large) and not fitting the data sufficiently (e.g., when the value of $n_u$ is too small).

The last layer (e.g., the output layer) of the DNN may be a dense NN. For example, the dense NN may be added to the DNN after the RNN. The dense NN layer may be associated with an input hyperparameter including the size associated with the set of vocabulary tokens (|V|), among other examples. In some implementations, the data processing system may forgo using a softmax classifier function to classify between different possible choices within the vocabulary (e.g., the text of the training corpus) each pass through the training process. In this case, by forgoing using of a softmax classifier function, the data processing system reduces a utilization of processing resources and reduces an amount of training time associated with training the DNN. The data processing system may train the DNN to converge to a solution for the following set of numerical optimization equations for one-sided backward set of sequences (1B-SOS), one-sided forward set of sequences (1F-SOS), and two-sided set of sequences (2-SOS), respectively:

$$\arg\min_{\theta} \frac{1}{|B|}\sum_{i=1}^{|B|}\log p\left(B_i \mid B_{i-n_s}, \ \ldots \ , B_{i-1}\right)$$

$$\arg\min_{\theta} \frac{1}{|B|}\sum_{i=1}^{|B|}\log p\left(B_i \mid B_{i+1}, \ \ldots \ , B_{i+n_B}\right)$$

$$\arg\min_{\theta} \frac{1}{|S|}\sum_{i=1}^{|B|}\log p\left(B_i \mid B_{i-n_s}, \ \ldots \ , B_{i-1}, B_{i+1}, \ \ldots \ , B_{i+n_s}\right)$$

where $n_B$ is a quantity of blocks to look backward or forward when training, i is a block index, and θ is a set of the DNN's parameters to be numerically optimized. A value of $n_B$ may be selected as one to simplify the training process. Therefore, the equations about may be rewritten as:

$$\arg\min_{\theta} \frac{1}{|B|}\sum_{i=1}^{|B|}\log p(B_i \mid B_{i-1})$$

$$\arg\min_{\theta} \frac{1}{|B|}\sum_{i=1}^{|B|}\log p(B_i \mid B_{i+1})$$

$$\arg\min_{\theta} \frac{1}{|B|}\sum_{i=1}^{|B|}\log p(B_i \mid B_{i-1}, B_{i+1})$$

The information content $I(B_i)$ of a given sequence $B_i$ may be represented as the negative logarithm of probability $p(B_i)$ or $I(B_i)=-\log_2 p(B_i)$. Therefore, the entropy (H) of all blocks in the training corpus may be defined as the expectation of the information content of all sequences in the set, which may be represented as:

$$H = \sum_{i\in 1:|B|} p(s_i)I(B) = -\sum_{i=1}^{|B|} p(B_i)\log_2 p(B_i)$$

The above equations may be used by an RNN (or a DNN that includes the RNN) to predict the characters in the sequences by computing target probabilities distribution over the entire vocabulary of the training corpus. The optimization problems for converging the RNN may be represented, for one-sided backward set of sequences (1B-SOS), one-sided forward set of sequences (1F-SOS), and two-sided set of sequences (2-SOS), respectively, as:

$$\arg\min_{\theta} \frac{1}{|B|}\sum_{i=1}^{|B|}\sum_{t=1}^{|V|}\log p\left(c_{t+1}^{B_i} \mid c_{t-l_B}^{B_i}, \ \ldots \ , c_{t-1}^{B_i}, c_t^{B_i}\right)$$

$$\arg\min_{\theta} \frac{1}{|B|}\sum_{i=1}^{|B|}\sum_{t=1}^{|V|}\log p\left(c_t^{B_i} \mid c_{t+1}^{B_i}, \ \ldots \ , c_{t+l_B}^{B_i}\right)$$

-continued $$\arg\min_{\theta} \frac{1}{|B|}\sum_{i=1}^{|B|}\sum_{t=1}^{|V|}\log p\left(c_{Bt}^{B_i} \mid c_{t-l_s}^{B_i}, \ldots , c_{t-1}^{B_i}, c_{t+1}^{B_i}, \ldots , c_{t+l_B}^{B_i}\right)$$

where $$c_t^{s_i}$$

is a character t in a given block $B_i$.

Therefore, using the optimization problems for converging the RNN (or the DNN that includes the RNN), the RNN may be trained using the training data set generated by the data processing system, as described above. Based on training and/or converging the RNN, the set of embedding tensors associated with the embedding layer may be obtained by the data processing system. The set of embedding tensors may be weights of the embedding layer applied to hidden units or neurons $n_u$ in the embedding layer. The set of embedding tensors may be a numerical representation of the pre-processed log data (e.g., of the text in the software logs). For example, an embedding tensor may represent a feature of the text in the software logs. By training the DNN to obtain the set of embedding tensors, the data processing system may obtain a numerical representation of the text in the software logs.

Figure 1E:
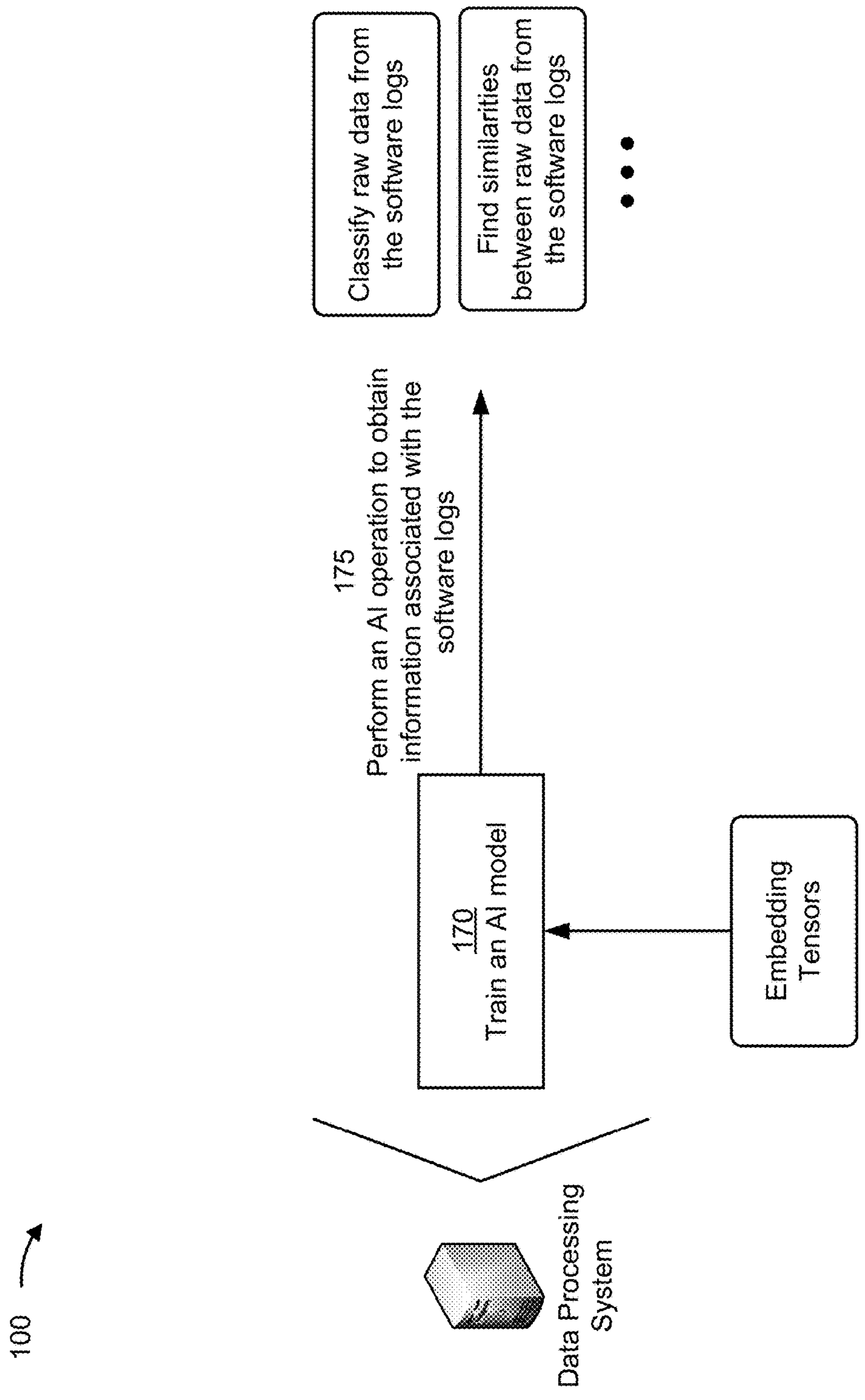

As shown in FIG. 1E, and by reference number 170, the data processing system may train an AI model or a machine learning model based on the set of embedding tensors (e.g., a set of dense embedding tensors, as described herein). For example, the data processing system may train the AI model to identify information associated with the text in the software logs based on the set of embedding tensors. As shown by reference number 175, the data processing system may perform an artificial intelligence operation using the set of embedding tensors to obtain information associated with the software log data. For example, performing the artificial intelligence operation may include classifying, using an artificial intelligence model that is trained based on the set of embedding tensors (e.g., that is trained based on using the set of embedding tensors as an input to the artificial intelligence model), the log data into one or more categories from a set of candidate categories. For example, for telecommunications software logs (e.g., generated by testing machines), the software logs may be classified as being associated with a physical (PHY) layer issue or not being associated with a PHY layer issue. As another example, the AI model may classify a software log into one category from multiple categories (e.g., 2 categories, 3 categories, 5 categories, or a different quantity of categories). As another example, performing the AI operation may include performing a similarity analysis of the set of log data to one or more other sets of log data. For example, based on providing embedding tensors of different software logs, the AI model may find sets of software logs that have a threshold degree of similarity. As another example, based on providing embedding tensors of different software logs, the AI model may categorize or sort sets of software logs based on the similarities of corresponding information contained within the sets of software logs (which may not readily understandable by humans). As a result, by obtaining the embedding tensors as described above, the data processing system may be enabled to obtain a numerical representation of software logs that efficiently and accurately maintains meaningful information or patterns within the software logs.

Figure 1F:
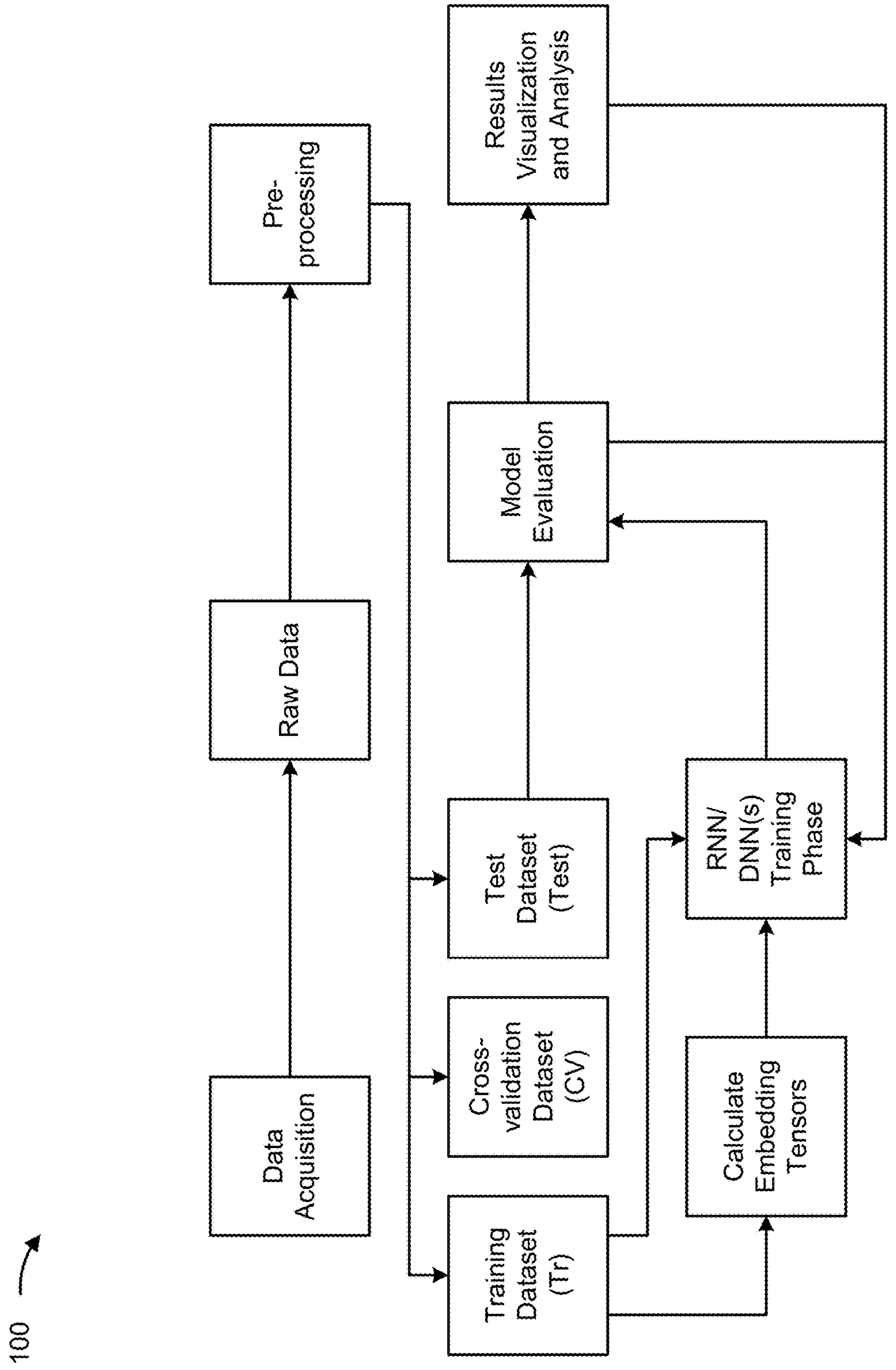

FIG. 1F is a diagram depicting a workflow for generating training data, validation data, and test data for a machine learning model, such as the DNN. As shown, the software logs identifying the raw data may be acquired (e.g., via data acquisition) by the data processing system from the service provider data structure. The data processing system may process the software logs to generate the final data, as described above, and may create a training dataset (Tr), a cross-validation dataset (CV), and a test dataset (Test) based on the final data. The training dataset may be utilized to calculate the embedding tensors from the DNN (e.g., a set of embedding vectors). The embedding tensors and the training dataset may be utilized during a training phase of the DNN model and to generate a trained DNN. The cross-validation dataset and the test dataset may be utilized to evaluate the trained DNN and to generate results and analysis. A visualization of the results and the analysis may be provided for display. The results and the analysis may also be utilized to retrain the trained DNN.

Figure 1G:
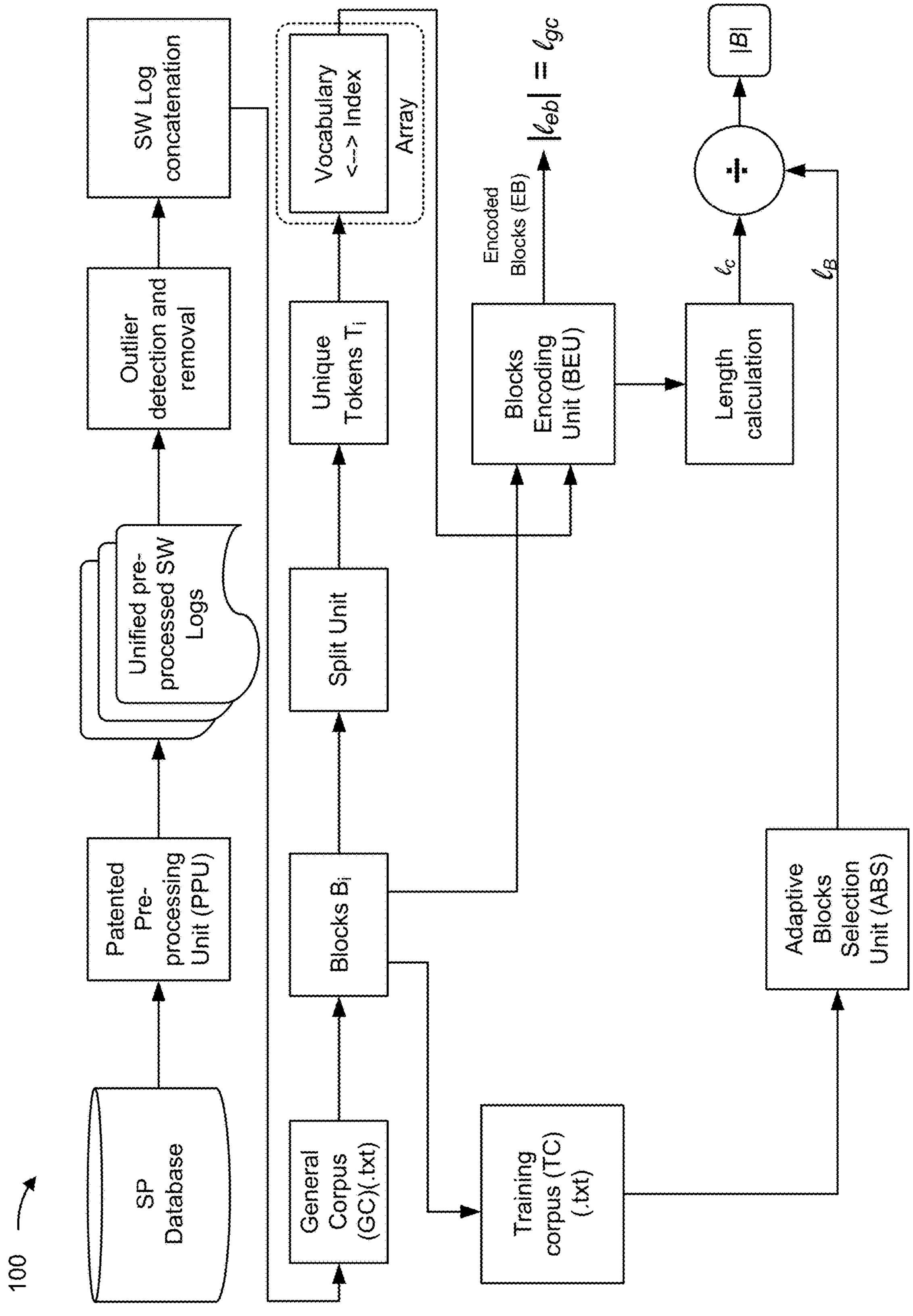

FIG. 1G is a diagram depicting a pipeline of the data processing system for converting raw data from software logs into encoded blocks. As shown, the software logs identifying the raw data may be collected and/or acquired by the data processing system from the service provider data structure. The data processing system may pre-process the software logs to generate unified pre-processed versions of the software logs, as described in more detail elsewhere herein. The data processing system may detect and remove outliers for the unified pre-processed logs. The data processing system may concatenate the unified pre-processed logs to form a general corpus (GC) (e.g., in a .txt format).

The data processing system may determine blocks $B_i$ for the general corpus. The data processing system may further split the Blocks $B_i$ into a set of tokens $T_i$ (e.g., vocabulary tokens). The data processing system may generate an array an array including a mapping of the unique tokens $t_i$, within a block $B_i$, to respective index values and provide the array to a block encoding unit (BEU) of the data processing system. The block encoding unit may encode the blocks corpus to obtain encoded blocks (EB), where the encoded blocks have a length or size $|l_{eb}|$ less than the length or size of the training corpus $|l_{gc}|$. Additionally, an adaptive block selection unit (ABS) of the data processing system may calculate the block length ($I_B$) based on data included in a training corpus generated from the set of blocks $B_i$ and the general corpus, as described in more detail elsewhere herein. The data processing system may determine a quantity of training sequences $|B|$ to be generated based on dividing a length (or size) of the encoded blocks ($l_c$) by the block length ($l_B$).

Figure 1H:
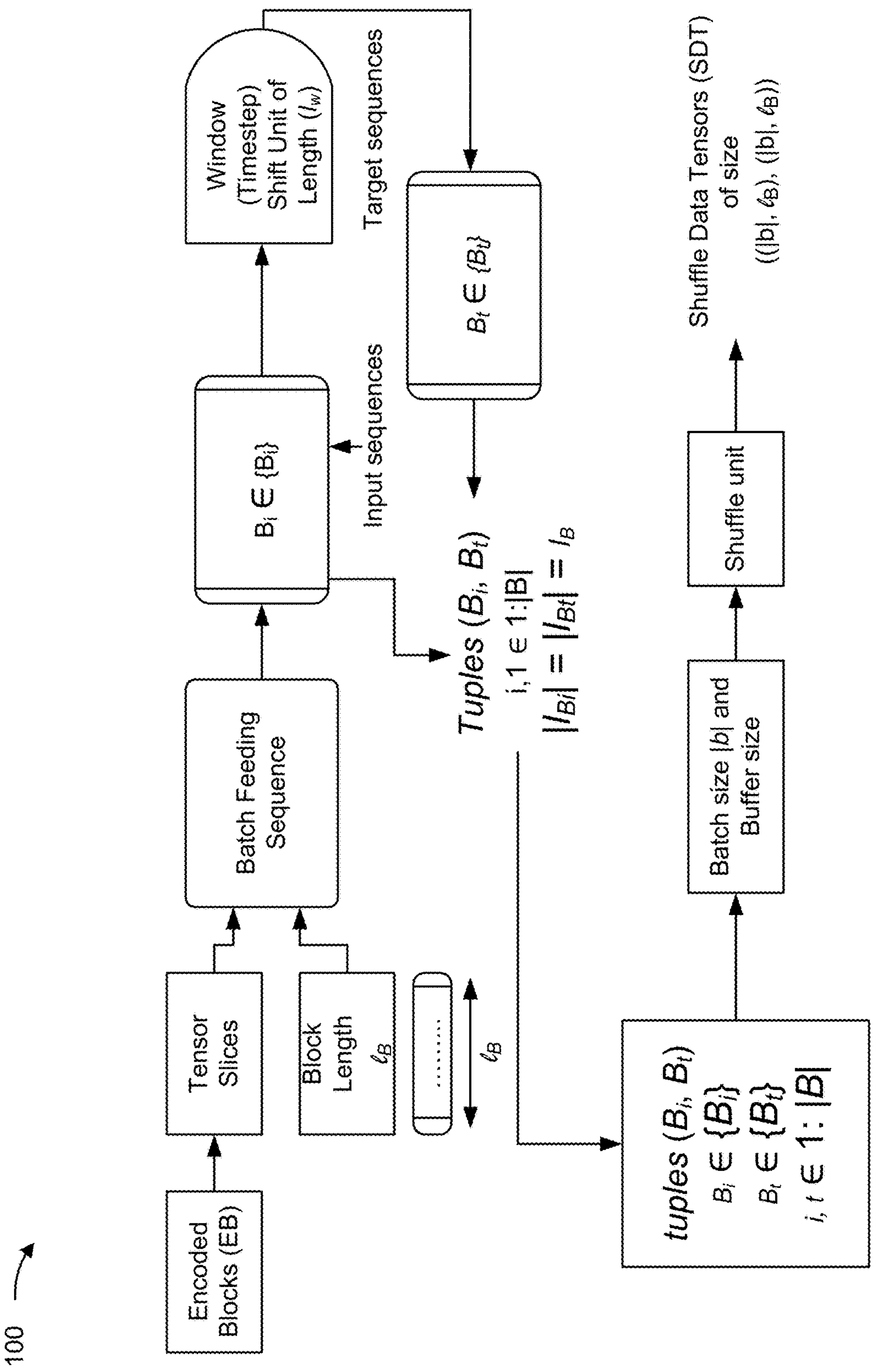

FIG. 1H is a diagram depicting a pipeline of the data processing system for generating a training data set (e.g., SDT) to be used for training the DNN. As shown in FIG. 1H, the data processing system may generate the set of input sequences ($B_i$) based on the encoded blocks of the general corpus, one or more tensor slices, and the block length ($I_B$). The data processing system may generate the set of target sequences ($B_t$) based on applying a window shift to the set of input sequences ($B_i$). Each input sequence and each target sequence may have a length equal to the block length ($l_B$). Additionally, i and t may span from 1 to $|B|$. The data processing system may combine the set of input sequences and the set of target sequences into a tuple. The data processing system may partition the tuple into batches based on the batch size and/or the buffer size. The data processing system may provide the batch(es) to a shuffle unit of the data processing system to shuffle the batch(es) (e.g., to reduce a likelihood of overfitting). The output of the shuffle unit may be the SDT, which may be used as the training data set of the DNN.

Figure 1I:
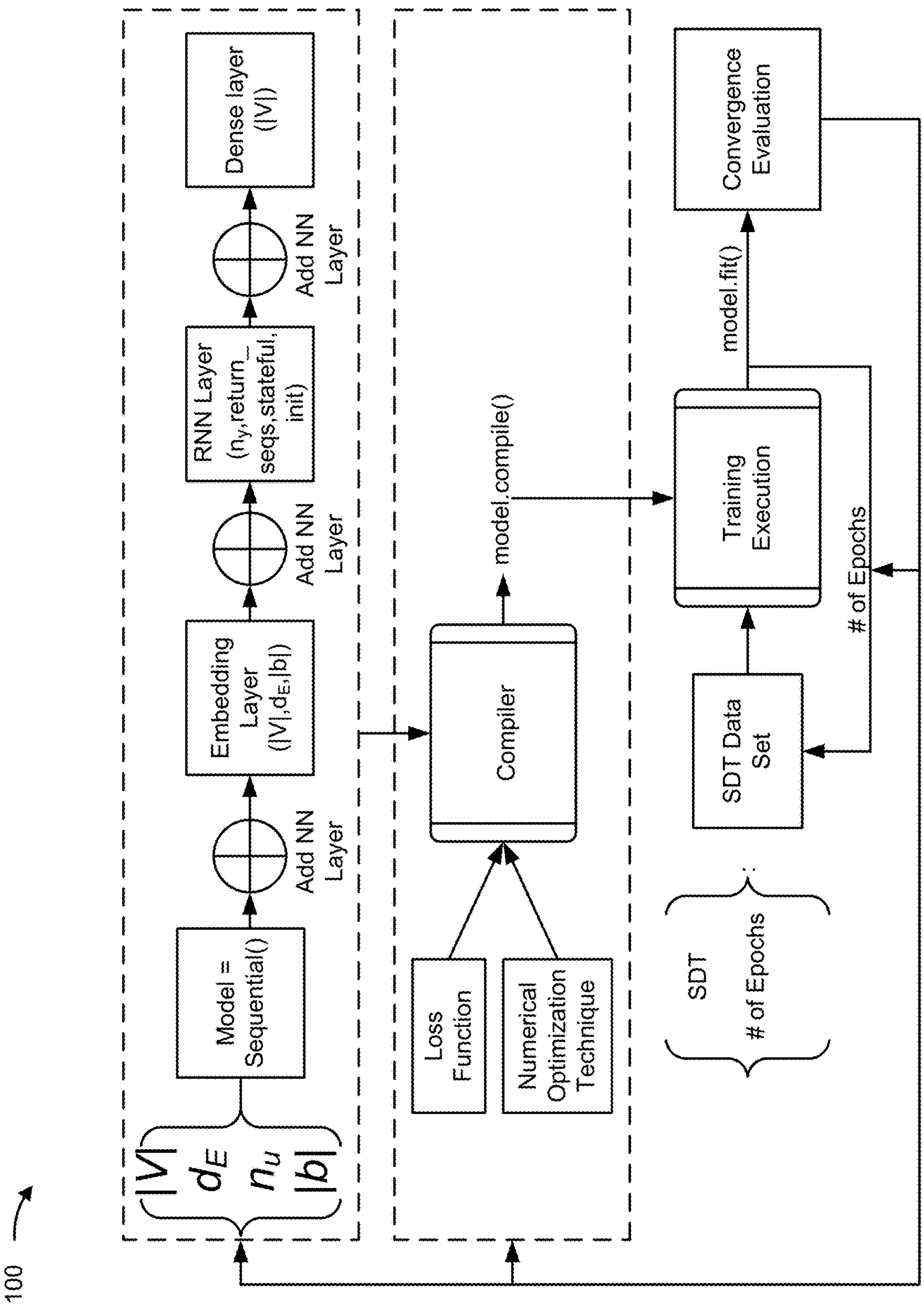

FIG. 1I is a diagram depicting a pipeline of the data processing system for training an RNN (or a DNN that includes an RNN) to obtain the dense embedding tensors that serve as the numerical representation of the software logs. As shown in FIG. 1I, and as described in more detail elsewhere herein, an DNN may include an embedding layer, an RNN layer, and a dense NN layer. Various hyperparameters may be provided as inputs to the different layers, as described above. Once the DNN is compiled, the data processing system may execute training the DNN based on the SDT data set (e.g., the training data set) for a quantity of epochs (e.g., which may be defined by a hyperparameter). The data processing system may evaluate a convergence of the DNN using various mathematical operations or equations, such as the equations described above. Once the DNN is converged and/or trained, the data processing system may obtain the embedding tensors from the embedding layer (e.g., weights applied in the embedding layer by the trained DNN). As described elsewhere herein, the embedding tensors may be numerical data that represents the textual data included in the software logs. The embedding tensors may be used as inputs to other AI models or machine learning models to classify, obtain information regarding, or find similarities between, various software logs (e.g., without performing an analysis or evaluation of the textual data included in the software logs).

As a result, the data processing system may transform text data (e.g., included in the software logs) into numerical data in a manner designed for the complex and sophisticated software logs. The data processing system may convert the text data into dense high dimensional tensors (e.g., the embedding tensors), where each dimension in the tensor space represents a feature extracted from the text data. Therefore, the features of the text data may be extracted without any human input defining the features. The implementations described herein provide an efficient, scalable, and adjustable technique for converting text data included in complex and sophisticated software logs into numeric data while maintaining all features (e.g., meaningful information) of the text data. A machine learning model or an AI model may be trained using the tensors (e.g., the dense embedding tensors) to obtain information associated with the software logs. For example, the machine learning model or an AI model may be trained to classify a software log or to find similar software logs based on the high dimensional tensors (e.g., the embedding tensors). As a result, meaningful information (e.g., a classification or a similarity analysis) may be obtained for a software log without requiring the information in the software log to be analyzed or interpreted (e.g., by a user or a device). This conserves significant time associated with analyzing the software logs. Additionally, this conserves computing resources, and/or networking resources, among other examples that would otherwise have been consumed in analyzing the software logs, making incorrect modifications to a network or system based on incorrectly analyzed software logs, and/or correcting the incorrect modifications to the network or system, among other examples. Further, once trained, the AI model may not require time consuming retraining each time the AI model is to be implemented. For example, via transfer learning, the AI model can be used and implemented on devices and/or systems with less computing and/or processing overhead.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
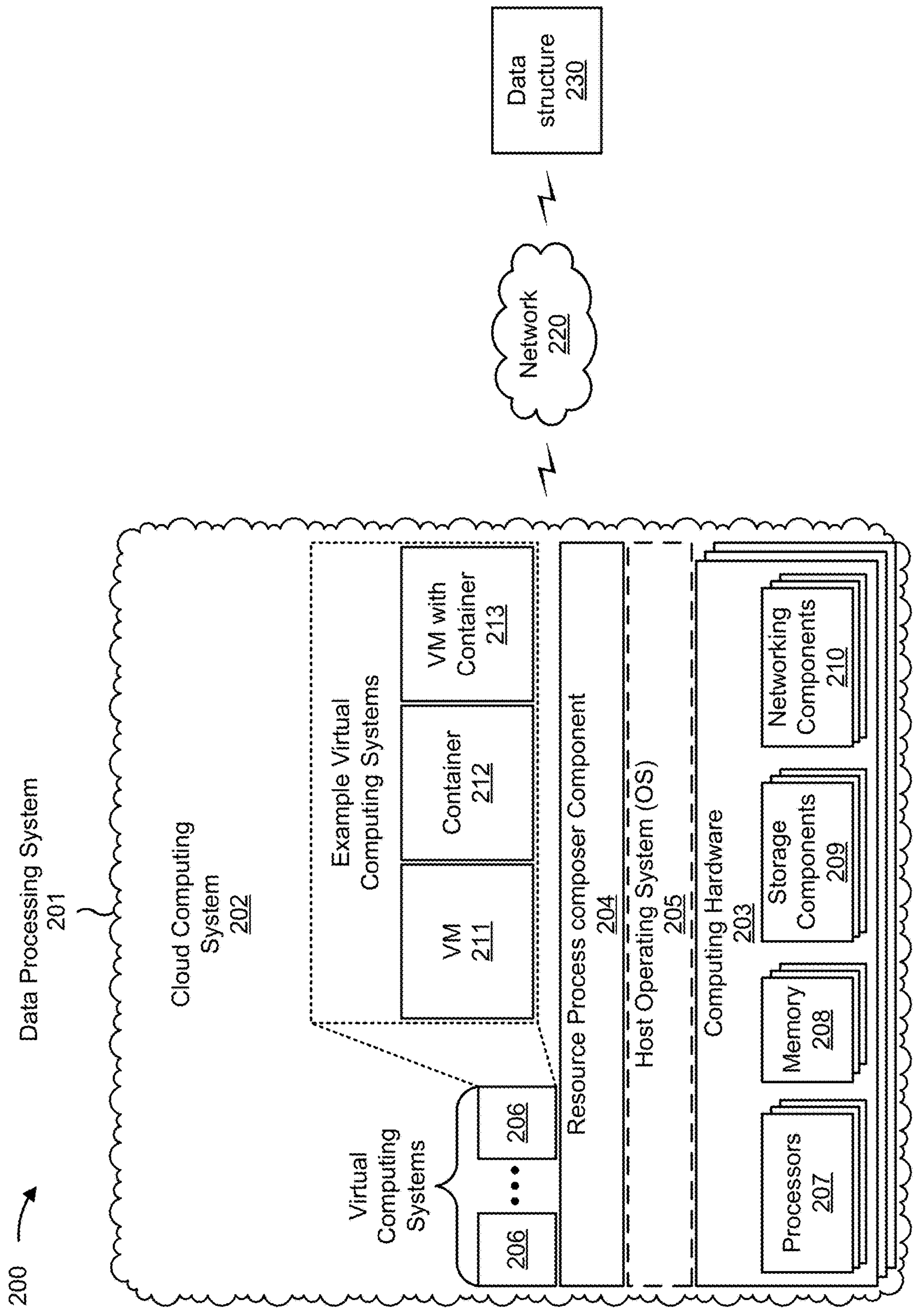
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a data processing system 201, which may include one or more elements of and/or may execute within a cloud computing system 202. The cloud computing system 202 may include one or more elements 203-213, as described in more detail below. As further shown in FIG. 2, the environment 200 may include a network 220 and/or a data structure 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the data processing system 201 may include one or more elements 203-213 of the cloud computing system 202, may execute within the cloud computing system 202, and/or may be hosted within the cloud computing system 202, in some implementations, the data processing system 201 may not be cloud-based (e.g., may be implemented outside of a cloud computing system) or may be partially cloud-based. For example, the data processing system 201 may include one or more devices that are not part of the cloud computing system 202, such as a device 300 of FIG. 3, which may include a standalone server or another type of computing device. The data processing system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The data structure 230 includes one or more devices capable of receiving, generating, storing, processing, and/or providing information, as described elsewhere herein. The data structure 230 may include a communication device and/or a computing device. For example, the data structure 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 230 may communicate with one or more other devices of the environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
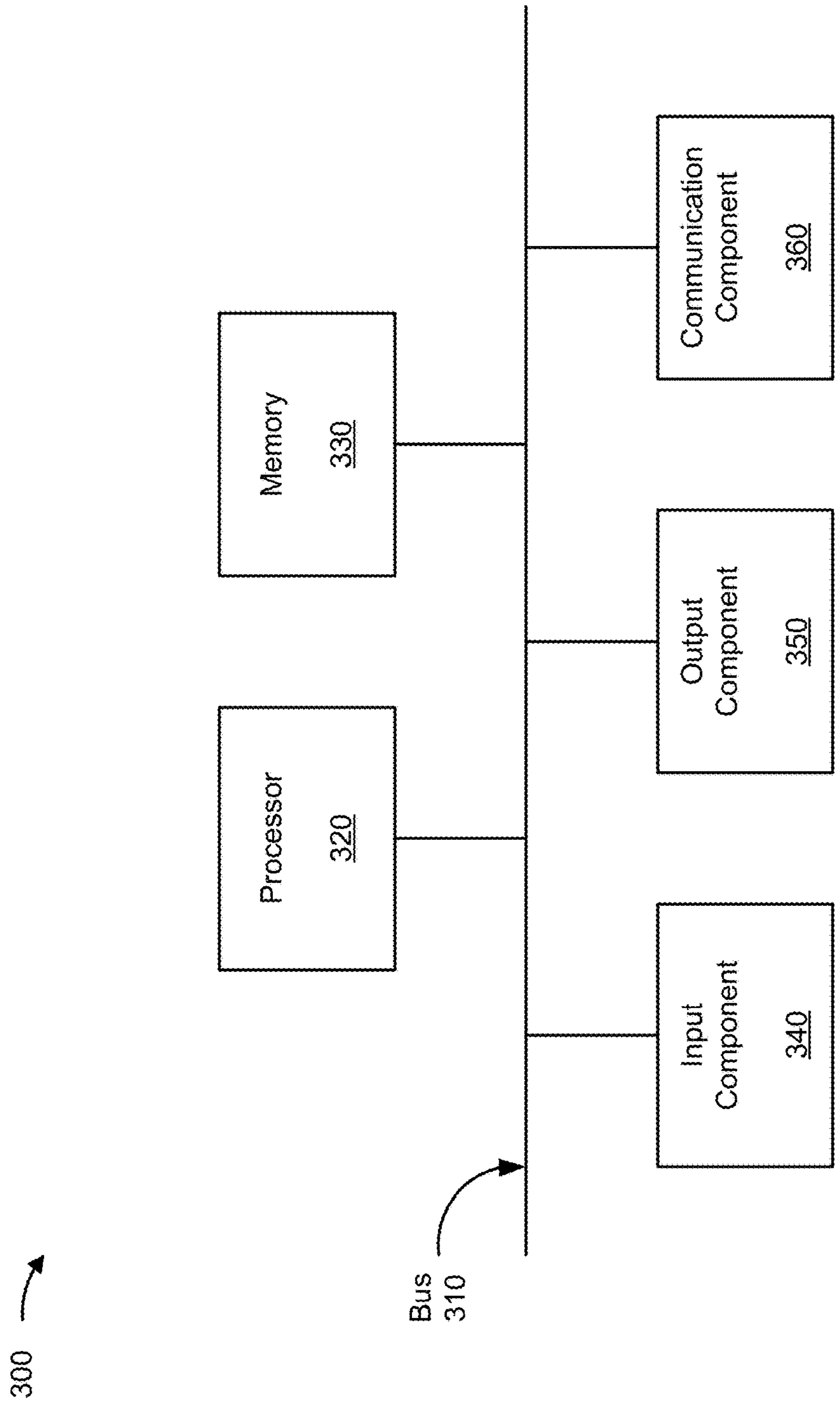
FIG. 3 is a diagram of example components of a device, which may correspond to the data processing system and/or the data structure.

FIG. 3 is a diagram of example components of a device 300, which may correspond to the data processing system 201 and/or the data structure 230. In some implementations, the data processing system 201 and/or the data structure 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
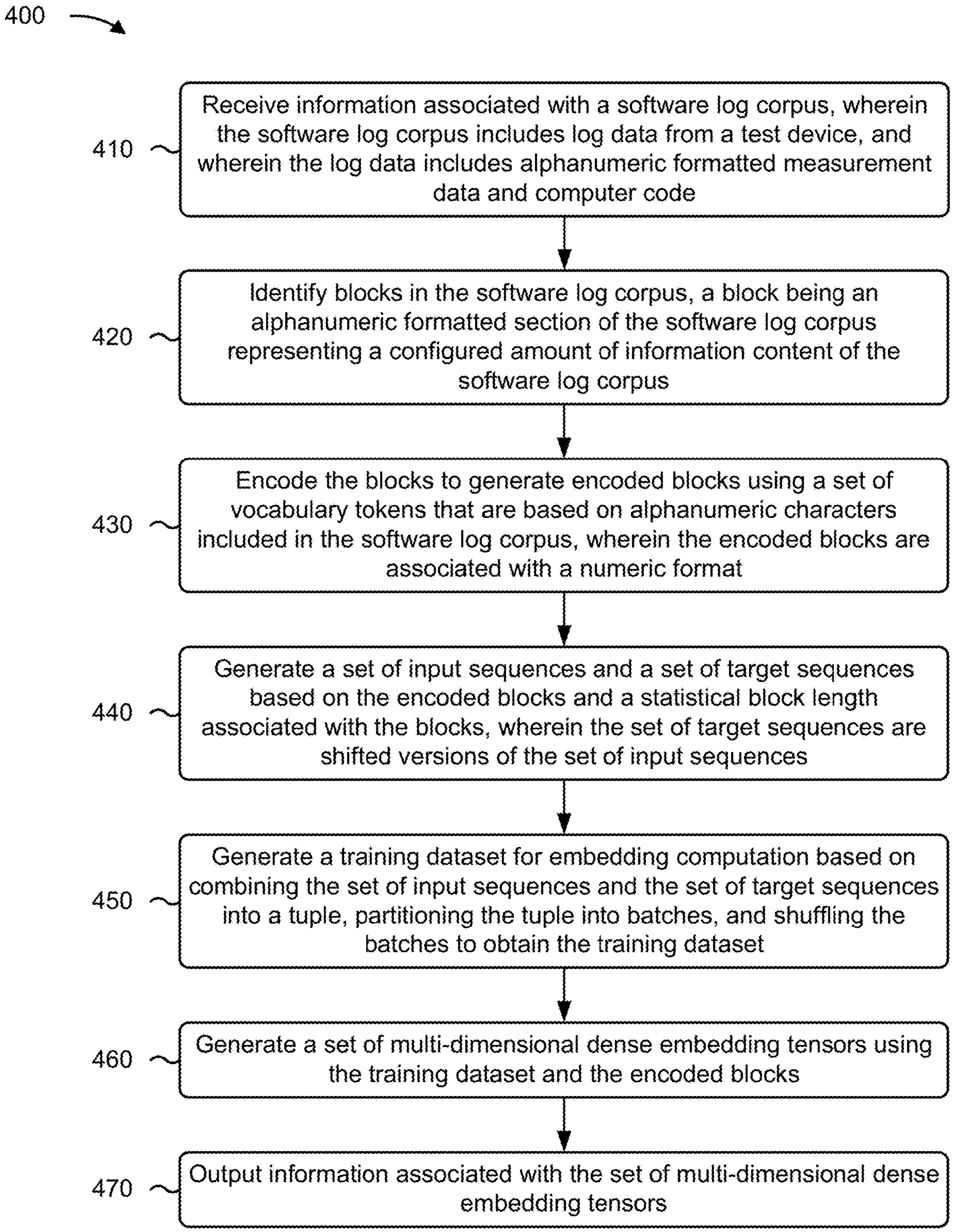
FIG. 4 is a flowchart of an example process associated with determination of dense embedding tensors for log data using blockwise RNNs.

FIG. 4 is a flowchart of an example process 400 associated with determination of dense embedding tensors for log data using blockwise recurrent neural networks. In some implementations, one or more process blocks of FIG. 4 are performed by a device (e.g., the data processing system 201). In some implementations, one or more process blocks of FIG. 4 are performed by another device or a group of devices separate from or including the device. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving information associated with a software log corpus, wherein the software log corpus includes log data from a test device, and wherein the log data includes alphanumeric formatted measurement data and computer code (block 410). For example, the device may receive information associated with a software log corpus, wherein the software log corpus includes log data from a test device, and wherein the log data includes alphanumeric formatted measurement data and computer code, as described above.

As further shown in FIG. 4, process 400 may include identifying blocks in the software log corpus, a block being an alphanumeric formatted section of the software log corpus representing a configured amount of information content of the software log corpus (block 420). For example, the device may identify blocks in the software log corpus, a block being an alphanumeric formatted section of the software log corpus representing a configured amount of information content of the software log corpus, as described above.

As further shown in FIG. 4, process 400 may include encoding the blocks to generate encoded blocks using a set of vocabulary tokens that are based on alphanumeric characters included in the software log corpus, wherein the encoded blocks are associated with a numeric format (block 430). For example, the device may encode the blocks to generate encoded blocks using a set of vocabulary tokens that are based on alphanumeric characters included in the software log corpus, wherein the encoded blocks are associated with a numeric format, as described above.

As further shown in FIG. 4, process 400 may include generating a set of input sequences and a set of target sequences based on the encoded blocks and a statistical block length associated with the blocks, wherein the set of target sequences are shifted versions of the set of input sequences (block 440). For example, the device may generate a set of input sequences and a set of target sequences based on the encoded blocks and a statistical block length associated with the blocks, wherein the set of target sequences are shifted versions of the set of input sequences, as described above.

As further shown in FIG. 4, process 400 may include generating a training dataset for embedding computation based on combining the set of input sequences and the set of target sequences into a tuple, partitioning the tuple into batches, and shuffling the batches to obtain the training dataset (block 450). For example, the device may generate a training dataset for embedding computation based on combining the set of input sequences and the set of target sequences into a tuple, partitioning the tuple into batches, and shuffling the batches to obtain the training dataset, as described above.

As further shown in FIG. 4, process 400 may include generating a set of multi-dimensional dense embedding tensors using the training dataset and the encoded blocks (block 460). For example, the device may generate a set of multi-dimensional dense embedding tensors using the training dataset and the encoded blocks, as described above.

As further shown in FIG. 4, process 400 may include outputting information associated with the set of multi-dimensional dense embedding tensors (block 470). For example, the device may output information associated with the set of multi-dimensional dense embedding tensors, as described above.

Process 400 may include additional implementations, such as any single implementation or any combination of implementations described below and/or in connection with one or more other processes described elsewhere herein.

In a first implementation, encoding the software log corpus to generate the encoded blocks comprises processing the information associated with the software log corpus to generate a set of pre-processed software logs, removing one or more outlier software logs from the set of pre-processed software logs to generate a non-outlier set of pre-processed software logs, and concatenating the non-outlier set of pre-processed software logs to generate a general corpus of the software log corpus and a training corpus of the software log corpus.

In a second implementation, alone or in combination with the first implementation, encoding the software log corpus to generate the encoded blocks comprises scanning the blocks to identify the set of vocabulary tokens, wherein a vocabulary token, of the set of vocabulary tokens, includes a set of characters representing a portion of the blocks, generating a vocabulary for the blocks based on the set of vocabulary tokens, generating an array representing a correspondence between the vocabulary and an index for the blocks, and encoding, using a block encoding unit and based on an array and a content of the blocks, the blocks to generate the encoded blocks.

In a third implementation, alone or in combination with one or more of the first and second implementations, the set of vocabulary tokens is based on unique characters included in the alphanumeric characters that are included in the blocks of the software log corpus.

In a fourth implementation, alone or in combination with one or more of the first through third implementations, process 400 includes detecting the blocks from a training corpus, of the software log corpus, based on one or more indicators included in the alphanumeric characters included in the training corpus, determining a size of each block included in the blocks, removing any blocks, from the blocks, that are associated with an outlier length, and calculating a statistical parameter based on sizes of blocks included in the blocks to obtain the statistical block length associated with the blocks.

In a fifth implementation, alone or in combination with one or more of the first through fourth implementations, encoding the training dataset for embedding computation comprises generating a set of tensor slices from the software log corpus, generating, using the encoded blocks, a statistical block length, and the set of tensor slices, a set of sequences of the software log corpus, applying a window shift unit to generate a set of target sequences from a set of input sequences of the set of sequences, wherein the window shift unit is a one-sided backward-looking window shift unit such that for each input sequence, of the set of input sequences, there is a single corresponding target sequence of the set of target sequences, and generating a set of tuples representing the set of input sequences and the set of target sequences.

In a sixth implementation, alone or in combination with one or more of the first through fifth implementations, encoding the training data set for embedding computation comprises generating a set of batches of data for training based on a set of tuples associated with the encoded blocks, wherein the set of batches of data are selected from the set of tuples based on a batch size parameter and a buffer size parameter, shuffling, using a shuffle unit, the set of batches of data, and constructing a set of shuffled data tensors based on shuffling the set of batches of data, wherein the shuffled data tensors are associated with a size based on the batch size parameter and a statistical block length parameter.

In a seventh implementation, alone or in combination with one or more of the first through sixth implementations, process 400 includes training an RNN to learn a set of dense embedding tensors using a set of shuffled data tensors associated with the training dataset and the encoded blocks, the set of dense embedding tensors being based on the training dataset, and outputting information associated with the set of dense embedding tensors.

In an eighth implementation, alone or in combination with one or more of the first through seventh implementations, training the RNN comprises selecting an embedding dimension, wherein the embedding dimension is associated with a length of a set of features captured for the set of multi-dimensional dense embedding tensors.

In a ninth implementation, alone or in combination with one or more of the first through eighth implementations, the embedding dimension is less than a threshold value.

In a tenth implementation, alone or in combination with one or more of the first through ninth implementations, generating the set of dense embedding tensors comprises generating an embedding layer as a first layer within a DNN, generating an RNN layer as a second layer within the DNN, and generating a dense neural network layer.

In an eleventh implementation, alone or in combination with one or more of the first through tenth implementations, the RNN layer includes at least one of an LSTM based layer or a GRU based layer.

In a twelfth implementation, alone or in combination with one or more of the first through eleventh implementations, an input to the RNN layer includes at least one of a quantity of neurons or a recurrent initializer.

In a thirteenth implementation, alone or in combination with one or more of the first through twelfth implementations, the dense neural network layer includes a vocabulary size as an argument to the dense neural network layer.

In a fourteenth implementation, alone or in combination with one or more of the first through thirteenth implementations, process 400 includes training the RNN to identify an association between a first block at a first position and a second block at a second position, the first position and the second position being within a threshold window size.

In a fifteenth implementation, alone or in combination with one or more of the first through fourteenth implementations, generating the set of dense embedding tensors comprises converging a set of numerical optimization equations for at least one of a one-sided backward set of sequences, a one-sided forward set of sequences, or a two-sided set of sequences.

In a sixteenth implementation, alone or in combination with one or more of the first through fifteenth implementations, process 400 includes training an RNN using the training dataset and based on one or more hyperparameters to obtain a set of embedding tensors associated with an embedding layer of the RNN, and performing an artificial intelligence operation using the set of embedding tensors to obtain information associated with new log data.

In a seventeenth implementation, alone or in combination with one or more of the first through sixteenth implementations, process 400 includes testing the RNN using a testing dataset feeding back a set of results of testing the RNN to retrain the RNN, and outputting information associated with the RNN based on feeding back the set of results.

In an eighteenth implementation, alone or in combination with one or more of the first through seventeenth implementations, process 400 includes receiving new log data associated with a new software log, analyzing the new log data using the RNN, and providing information associated with a result of analyzing the new log data.

In a nineteenth implementation, alone or in combination with one or more of the first through eighteenth implementations, process 400 includes receiving new log data associated with a new software log, analyzing the new log data using the RNN, generating a recommendation of a configuration change for a communication system associated with the new software log, and automatically implementing the configuration change for the communication system.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors, coupled to the one or more memories, configured to:
receive software logs identifying raw data;
pre-process the raw data to obtain a set of pre-processed log data;
detect one or more outlier data sets from the set of pre-processed log data based on one or more of a length or size of the one or more outlier data sets;
remove the one or more outlier data sets from the set of pre-processed log data;
concatenate the set of pre-processed log data after the one or more outlier data sets are removed to form a software log corpus, wherein the software log corpus includes log data from a test device, and wherein the log data includes alphanumeric formatted measurement data and computer code;
identify blocks in the software log corpus, a block being an alphanumeric formatted section of the software log corpus representing a configured amount of information content of the software log corpus;
encode the blocks to generate encoded blocks using a set of vocabulary tokens that are based on alphanumeric characters included in the software log corpus, wherein the encoded blocks are associated with a numeric format;
generate a set of input sequences and a set of target sequences based on the encoded blocks and a statistical block length associated with the blocks, wherein the set of target sequences are shifted versions of the set of input sequences;
generate a training dataset for embedding computation based on combining the set of input sequences and the set of target sequences into a tuple, partitioning the tuple into batches, and shuffling the batches to obtain the training dataset;
train a recurrent neural network (RNN) to learn a set of dense embedding tensors using a set of shuffled data tensors associated with the training dataset and the encoded blocks, the set of dense embedding tensors being based on the training dataset;
perform an artificial intelligence operation using the set of dense embedding tensors to obtain information associated with new log data;
generate a recommendation of a configuration change for a communication system associated with a new software log associated with the new log data; and
automatically implement the configuration change for the communication system.

2. The device of claim 1, wherein the one or more processors, to train the RNN, are configured to:
select an embedding dimension, wherein the embedding dimension is associated with a length of a set of features captured for the set of multi-dimensional dense embedding tensors.

3. The device of claim 2, wherein the embedding dimension is less than a threshold value.

4. The device of claim 1, wherein the one or more processors, to generate the set of dense embedding tensors, are configured to:
generate an embedding layer as a first layer within a deep neural network (DNN);
generate an RNN layer as a second layer within the DNN; and
generate a dense neural network layer.

5. The device of claim 4, wherein the RNN layer includes at least one of a long short-term memory (LSTM) based layer or a gated recurrent unit (GRU) based layer.

6. The device of claim 4, wherein an input to the RNN layer includes at least one of a quantity of neurons or a recurrent initializer.

7. The device of claim 4, wherein the dense neural network layer includes a vocabulary size as an argument to the dense neural network layer.

8. The device of claim 4, wherein the one or more processors, to train the RNN, are configured to:
train the RNN to identify an association between a first block at a first position and a second block at a second position, the first position and the second position being within a threshold window size.

9. The device of claim 4, wherein the one or more processors, to generate the set of dense embedding tensors, are configured to:
converge a set of numerical optimization equations for at least one of:
a one-sided backward set of sequences,
a one-sided forward set of sequences, or
a two-sided set of sequences.

10. A method, comprising:
receiving, by a device, software logs identifying raw data;
pre-processing, by the device, the raw data to obtain a set of pre-processed log data;
detecting, by the device, one or more outlier data sets from the set of pre-processed log data based on one or more of a length or size of the one or more outlier data sets;
removing, by the device, the one or more outlier data sets from the set of pre-processed log data;
concatenating, by the device, the set of pre-processed log data after the one or more outlier data sets are removed to form a software log corpus, wherein the software log corpus includes log data from a test device, and wherein the log data includes alphanumeric formatted measurement data and computer code;
identifying, by the device, blocks in the software log corpus, a block being an alphanumeric formatted section of the software log corpus representing a configured amount of information content of the software log corpus;

encoding, by the device, the blocks to generate encoded blocks using a set of vocabulary tokens that are based on alphanumeric characters included in the software log corpus, wherein the encoded blocks are associated with a numeric format;

generating, by the device, a set of input sequences and a set of target sequences based on the encoded blocks and a statistical block length associated with the blocks, wherein the set of target sequences are shifted versions of the set of input sequences;

generating, by the device, a training dataset for embedding computation based on combining the set of input sequences and the set of target sequences into a tuple, partitioning the tuple into batches, and shuffling the batches to obtain the training dataset;

training, by the device, a recurrent neural network (RNN) to learn a set of dense embedding tensors using a set of shuffled data tensors associated with the training dataset and the encoded blocks, the set of dense embedding tensors being based on the training dataset;

performing, by the device, an artificial intelligence operation using the set of dense embedding tensors to obtain information associated with new log data;

generating, by the device, a recommendation of a configuration change for a communication system associated with a new software log associated with the new log data; and automatically implementing, by the device, the configuration change for the communication system.

11. The method of claim 10, wherein encoding the blocks to generate the encoded blocks comprises:

scanning the blocks to identify the set of vocabulary tokens, wherein a vocabulary token, of the set of vocabulary tokens, includes a set of characters representing a portion of the blocks;

generating a vocabulary for the blocks based on the set of vocabulary tokens;

generating an array representing a correspondence between the vocabulary and an index for the blocks; and encoding, using a block encoding unit and based on an array and a content of the blocks, the blocks to generate the encoded blocks.

12. The method of claim 10, wherein the set of vocabulary tokens is based on unique characters included in the alphanumeric characters that are included in the blocks of the software log corpus.

13. The method of claim 10, further comprising:

detecting the blocks from a training corpus, of the software log corpus, based on one or more indicators included in the alphanumeric characters included in the training corpus;

determining a size of each block included in the blocks;

removing any blocks, from the blocks, that are associated with an outlier length; and calculating a statistical parameter based on sizes of blocks included in the blocks to obtain the statistical block length associated with the blocks.

14. The method of claim 10, wherein generating the training dataset for embedding computation comprises:

generating a set of tensor slices from the software log corpus;

generating, using the encoded blocks, a statistical block length, and the set of tensor slices, a set of sequences of the software log corpus;

applying a window shift unit to generate a set of target sequences from a set of input sequences of the set of sequences, wherein the window shift unit is a one-sided backward-looking window shift unit such that for each input sequence, of the set of input sequences, there is a single corresponding target sequence of the set of target sequences; and generating a set of tuples representing the set of input sequences and the set of target sequences.

15. The method of claim 10, wherein generating the training dataset for embedding computation comprises:

generating a set of batches of data for training based on a set of tuples associated with the encoded blocks, wherein the set of batches of data are selected from the set of tuples based on a batch size parameter and a buffer size parameter;

shuffling, using a shuffle unit, the set of batches of data; and constructing a set of shuffled data tensors based on shuffling the set of batches of data, wherein the shuffled data tensors are associated with a size based on the batch size parameter and a statistical block length parameter.

16. A non-transitory computer-readable medium storing a set of instructions, the set of instructions comprising:

one or more instructions that, when executed by one or more processors of a device, cause the device to:

receive software logs identifying raw data;

pre-process the raw data to obtain a set of pre-processed log data;

detect one or more outlier data sets from the set of pre-processed log data based on one or more of a length or size of the one or more outlier data sets;

remove the one or more outlier data sets from the set of pre-processed log data;

concatenate the set of pre-processed log data after the one or more outlier data sets are removed to form a software log corpus, wherein the software log corpus includes log data from a test device, and wherein the log data includes alphanumeric formatted measurement data and computer code;

identify blocks in the software log corpus, a block being an alphanumeric formatted section of the software log corpus representing a configured amount of information content of the software log corpus;

encode the blocks to generate encoded blocks using a set of vocabulary tokens that are based on alphanumeric characters included in the software log corpus, wherein the encoded blocks are associated with a numeric format;

generate a set of input sequences and a set of target sequences based on the encoded blocks and a statistical block length associated with the blocks, wherein the set of target sequences are shifted versions of the set of input sequences;

generate a training dataset for embedding computation based on combining the set of input sequences and the set of target sequences into a tuple, partitioning the tuple into batches, and shuffling the batches to obtain the training dataset;

train a recurrent neural network (RNN) to learn a set of dense embedding tensors using a set of shuffled data tensors associated with the training dataset and the encoded blocks, the set of dense embedding tensors being based on the training dataset;

perform an artificial intelligence operation using the set of dense embedding tensors to obtain information associated with new log data;

generate a recommendation of a configuration change for a communication system associated with a new software log associated with the new log data; and automatically implement the configuration change for the communication system.

17. The non-transitory computer-readable medium of claim 16, wherein the one or more instructions further cause the device to:

test the RNN using a testing dataset;

feed back a set of results of testing the RNN to retrain the RNN; and output information associated with the RNN based on feeding back the set of results.

18. The non-transitory computer-readable medium of claim 16, wherein the one or more instructions further cause the device to:

receive the new log data;

analyze the new log data using the RNN; and provide information associated with a result of analyzing the new log data.

19. The non-transitory computer-readable medium of claim 16, wherein the one or more instructions, to generate the recommendation, cause the device to:

receive the new log data;

analyze the new log data using the RNN; and generate the recommendation based on analyzing the new log data.

20. The method of claim 10, wherein performing the artificial intelligence operation comprises:

classifying, using an artificial intelligence model that is trained based on the set of dense embedding tensors, the new log data into one or more categories from a set of candidate categories; and performing a similarity analysis.

* * * * *